US006622973B2

(12) United States Patent
Al-Garni et al.

(10) Patent No.: US 6,622,973 B2
(45) Date of Patent: Sep. 23, 2003

(54) MOVABLE SURFACE PLANE

(75) Inventors: Ahmed Z. Al-Garni, Dharan (SA);
Amro M. Al-Qutub, Dharan (SA)

(73) Assignee: King Fahd University of Petroleum and Minerals, Dharan (SA)

( * ) Notice: Subject to any disclaimer, the term of this patent is extended or adjusted under 35 U.S.C. 154(b) by 0 days.

(21) Appl. No.: 10/187,953

(22) Filed: Jul. 3, 2002

(65) Prior Publication Data

US 2002/0179777 A1 Dec. 5, 2002

Related U.S. Application Data

(63) Continuation-in-part of application No. 09/564,576, filed on May 5, 2000, now abandoned.

(51) Int. Cl.⁷ .............................................. B64C 21/06
(52) U.S. Cl. ...................................... 244/206; 244/207
(58) Field of Search .............................. 244/206, 207, 244/209, 219, 130, 134

(56) References Cited

U.S. PATENT DOCUMENTS

| 1,674,169 A | 6/1928 | Flettner |
| 1,785,300 A | 12/1930 | Castelcicala |
| 1,840,594 A | 1/1932 | Minor |
| 1,879,594 A | 9/1932 | Trey |
| 1,957,413 A | 5/1934 | Price |
| 2,928,626 A | 3/1960 | Tino |
| 3,128,973 A | 4/1964 | Dannenberg |
| 3,149,804 A | 9/1964 | Litz |
| 3,448,714 A | 6/1969 | Brooks |
| 5,114,100 A | 5/1992 | Rudolph et al. |
| 5,180,119 A | 1/1993 | Picard |
| 5,222,698 A | 6/1993 | Nelson et al. |
| 5,263,667 A | 11/1993 | Horstman |
| 5,366,177 A | 11/1994 | DeCoux |
| 5,447,283 A | 9/1995 | Tindell |
| 5,590,854 A | 1/1997 | Shatz |
| 5,772,156 A | 6/1998 | Parikh et al. |
| 5,791,601 A | 8/1998 | Dancila et al. |
| 5,813,625 A | 9/1998 | Hassan et al. |
| 6,109,565 A | 8/2000 | King, Sr. |
| 6,142,425 A | 11/2000 | Armanios et al. |
| 6,216,982 B1 | 4/2001 | Pfennig et al. |

FOREIGN PATENT DOCUMENTS

| EP | 532093 | 3/1993 |
| FR | 1053332 | 2/1954 |
| GB | 233083 | 5/1925 |
| GB | 332754 | 7/1930 |
| IT | 301844 | 10/1932 |

OTHER PUBLICATIONS

1981, Modi, V. J. et al., "Moving–Surface Boundary–Layer Control for Aircraft Operation at High Incidence," Abstract.
1988, Modi, V. J. et al., "Bound Vortex Boundary Layer Control with Application to V/STOL Airplanes," Abstract.

Primary Examiner—Galen L. Barefoot
(74) Attorney, Agent, or Firm—Richard C. Litman

(57) ABSTRACT

Movable surface planes include opposed independently movable endless surfaces over the majority of opposite sides of the planes. By moving one surface in the same direction as the fluid flow about the plane, and the opposite surface in a direction opposite the fluid flow, the flow is accelerated across the surface moving in the same direction to produce a lesser pressure, and retarded across the surface moving in the opposite direction to produce a greater pressure. The net result is a force urging the plane toward the surface moving in the direction of ambient fluid flow. The two surfaces of the present invention may be operated independently of one another, to move in the same or opposite directions and to have the same or different velocities. The movable surfaces are porous and communicate with ductwork within the structure, to provide fluid flow through the surfaces for boundary layer control.

27 Claims, 10 Drawing Sheets

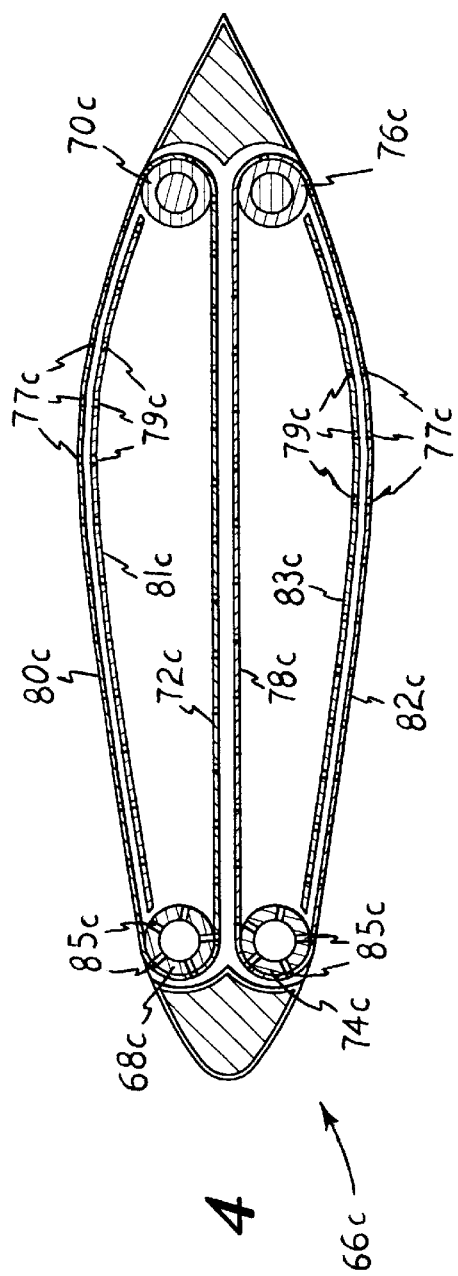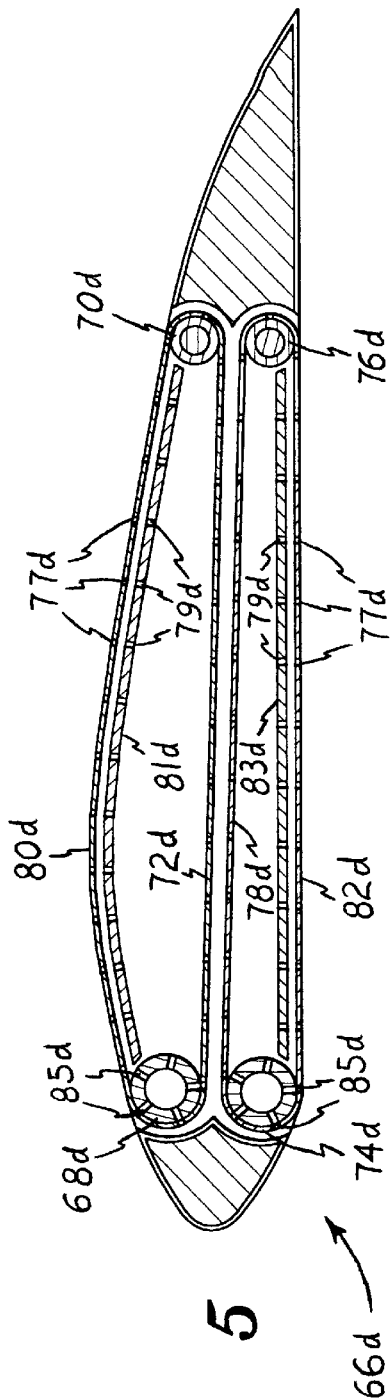

MOVABLE SURFACE PLANE

REFERENCE TO RELATED PATENT APPLICATION

This application is a continuation-in-part of U.S. patent application Ser. No. 09/564,576, filed on May 5, 2000, now abandoned.

BACKGROUND OF THE INVENTION

1. Field of the Invention

The present invention relates generally to aerodynamic, flight dynamics, and hydrodynamic devices, and more specifically to an airfoil or hydrofoil having independently movable surfaces on each side or surface thereof and incorporating selective fluid flow means through the surface(s), i.e., suction or "blown" surfaces. The present invention is adaptable to various devices in the field of aerospace engineering as well as in the marine environment. Hence, the term "plane" as used throughout the present disclosure, refers to a generally planar lifting or control surface (e.g., wing, fin, etc.) for dynamic operation in a fluid, and is adaptable for use in any practicable fluid, including gases such as air and liquids such as water.

2. Description of the Related Art

The development of aviation and the maritime industries has led to ever more efficient shapes and configurations for aerospace craft and marine vessels. Numerous advances have occurred over the years, including laminar flow shapes, leading and trailing edge devices for airfoils, etc. However, all such surfaces or planes rely upon the principle of differential pressure upon opposite surfaces of the plane in order to develop a lifting or turning force, depending upon their orientation and function.

The differential pressure is developed by moving a fluid over one surface of the plane at a greater velocity than the fluid moving over the opposite surface of the plane. Bernoulli explained this principle in the eighteenth century, developing the mathematical concept that pressure varies inversely according to the square of the fluid velocity over a given surface. Accordingly, most surfaces which are intended to provide a generally constant force in a predetermined direction (e.g., aircraft wings) are configured with a greater curvature over one side thereof than the opposite side, and/or operate at a positive angle of attack to develop the desired pressure differential.

Later, others recognized other means of providing such differential pressure by mechanically accelerating the fluid flow over one side of the surface. Aircraft have been developed using "blown surfaces" or "blown flaps," in which jet exhaust is expelled over the upper surface of a wing to increase the velocity of the flow over that area and generate relatively greater lifting force. Other devices have been developed for entraining the fluid flow adjacent to the surface of the plane, by moving the surface to reduce the velocity differential between the surface and the fluid stream. This reduces the drag of the surface upon the fluid to provide a greater fluid velocity, or may accelerate the fluid to a velocity greater than that of the surface through the fluid, to provide a greater differential in velocity between the plane and the fluid for greater lifting force. Such devices are described further below.

As the sciences of aerodynamic and hydrodynamic engineering developed, the problem of control of the boundary layer of fluid immediately adjacent the surface became apparent. It was recognized as early as the 1930s that significant improvements in performance could be achieved, if some means were found to prevent the boundary layer from becoming turbulent immediately adjacent the surface, and/or to eliminate or minimize such turbulence when it occurred. "Laminar" airfoils and other shapes were created as a result, with these surfaces and shapes serving to delay, but not eliminate, the onset of turbulent flow.

Still later, it was recognized that providing some means of drawing the turbulent layer of fluid immediately adjacent the surface, into the surface (i.e., suction), served to prolong the laminar flow of fluid over the surface and thus improve performance of the craft. In some instances, applying fluid to the exterior of the surface can serve to enhance performance as well, as by "tripping" the boundary layer ahead of the normal transition point to preclude excessive turbulence at the transition from laminar to turbulent flow.

However, none of the devices known to the present inventors provides an independently movable surface on each side of a two surface plane, as well as means for inducing fluid flow through the surface (either suction or blowing), as provided by the present invention. The present invention provides a significant improvement over the prior art, by providing independently movable surfaces upon both sides of the plane and means for producing fluid flow through the movable surfaces. Thus, fluid flow may be accelerated across one surface by moving the surface in the direction of flow (opposite the direction of travel), while retarding flow over the opposite surface by moving the surface against the direction of flow (in the direction of travel). This provides a greater differential in fluid velocity over the two surfaces, thereby increasing the pressure differential between the surfaces to provide greater differential forces between the sides than are attainable with prior art devices, to improve lift, reduce drag, and improve the lift to drag ratio (aerodynamic performance). Also, moving the lower surface in the direction of flow reduces drag by reducing shear stress on the surface. The provision of blown or suction flow through the movable surfaces provides additional benefits in the control of the boundary layer immediately adjacent to the surface.

The present invention may also provide a delay in flow separation over one or both surfaces of the plane, by providing a predetermined velocity differential between the moving surface and the relative flow. By adjusting the velocity of the two independent moving surfaces of the present invention, a delay in separation may be achieved by adding momentum to the boundary layer over the upper surface, particularly at higher angles of attack. The provision for blowing or drawing fluid through the surface, provides further benefits in control of the separation of the fluid over and around the surface(s).

A discussion of the related art of which the present inventors are aware, and its differences and distinctions from the present invention, is provided below.

U.S. Pat. No. 1,674,169 issued on Jun. 19, 1928 to Anton Flettner, titled "Arrangement For Exchanging Energy Between A Current And A Body Therein," describes a series of embodiments generally employing cylinders to develop a Magnus effect or force. In some embodiments multiple cylinders are used, while in other embodiments at least a forward and a rearward cylinder are employed with a movable surface extending around the cylinders. None of the embodiments disclosed by Flettner provides independently movable surfaces on each side of the airfoil or hydrofoil, which independent dual surfaces are a part of the present invention. In addition, Flettner does not disclose any means for causing a fluid to flow through his movable (or stationary) surfaces, which fluid flow through the surface(s) is a part of the present invention.

U.S. Pat. No. 1,785,300 issued on Dec. 16, 1930 to Filiberto de la Tour Castelcicala, titled "Rolling Apron For Airplane Wings," describes an airfoil having a series of endless flexible belts which wrap about both the upper and lower surface and around the leading and trailing edge of the wing. Drive rollers are provided at the leading and trailing edges, with pinions engaging toothed bands disposed along the inner surfaces of the belts. The upper and lower surfaces of the de la Tour Castelcicala wing are interdependent, with the velocity of one surface determining the velocity of the opposite surface. If the upper surface of the de la Tour Castelcicala wing is traveling forwardly relative to the wing structure, then the lower surface must travel rearwardly. The planes of the present invention, with their two independently moving opposite surfaces, overcomes this deficiency. Moreover, de la Tour Castelcicala did not provide any actuation or control means for his movable surface, nor did he specify any direction of surface movement for optimum effect. It is also noted that de la Tour Castelcicala does not provide any means of moving a fluid through the surfaces of his airfoil.

U.S. Pat. No. 1,840,594 issued on Jan. 12, 1932 to Victor Minor, titled "Aeroplane," describes at least one embodiment comprising a wing having a single endless belt traveling about both the upper and lower surfaces of the wing. While Minor also describes means for providing power to drive his system, he does not describe any means of controlling the system to provide varying relative velocities as desired. Thus, the Minor wing is basically similar to that of de la Tour Castelcicala patent discussed above, with its lack of independently movable opposite surfaces. It is also noted that Minor does not provide any means of inducing a fluid flow through the surface of his wing.

U.S. Pat. No. 1,879,594 issued on Sep. 27, 1932 to Serge Trey, titled "Aeroplane Wing," describes an airfoil having a rotating cylindrical leading edge. The Trey device does not cover essentially the entire upper and lower surfaces of the airfoil with a moving surface, as provided by the present invention. Moreover, while Trey discloses a means of powering his rotary leading edge, he is silent regarding the direction of rotation and also any control means for the device. The present disclosure includes control means for adjusting the amount of pressure, or differential pressure, produced by the present movable surfaces. As in the case of other fluid control surfaces of which the present inventors are aware, Trey fails to provide any means of passing air or other fluid through the rotating leading edge surface of his wing.

U.S. Pat. No. 1,957,413 issued on May 1, 1934 to Albert O. Price, titled "Air Control Apparatus," describes a concept having at least one embodiment in which air is drawn through a porous upper wing surface and discharged through a porous lower wing surface. No movable airfoil surfaces are provided by Price, nor is any means provided for selectively reversing the fluid flow from pressure to suction as desired, as provided by the present invention.

U.S. Pat. No. 2,928,626 issued on Mar. 15, 1960 to Ovid Tino, titled "Sustaining Airfoil With Retractable Cylindrical Rotor," describes a wing having a rotating cylindrical trailing edge, essentially the opposite configuration to that of the Trey U.S. Patent discussed immediately above. Tino uses circulation theory and additive slipstream vectors to show that the addition of the trailing edge cylinder causes the rearward separation to extend downward beneath the trailing edge of the wing, thereby providing greater lifting force. However, he does not describe any means of moving either the upper or the lower surface of the airfoil to provide higher lift coefficients and/or to maintain attached flow at higher angles of attack, nor of providing fluid flow through the airfoil surface to enhance flow over the surface, as achieved by the present invention.

U.S. Pat. No. 3,128,973 issued on Apr. 14, 1964 to Robert E. Dannenberg, titled "Porous Material," describes a composite having a porous surface sheet with a honeycomb structure therebeneath. Both the porous surface sheet and the honeycomb can be adjusted as desired to provide the desired permeability and porosity. However, Dannenberg does not provide any means of constructing such composite sheets in endless flexible bands to form movable airfoil or hydrofoil surfaces, as provided by the present invention, nor does he disclose any means of powering such movable surfaces nor of providing the desired fluid pressure or suction through his porous surfaces.

U.S. Pat. No. 3,149,804 issued on Sep. 22, 1964 to Charles J. Litz, Jr., titled "Anti-Stall System," describes a wing having a porous upper surface which communicates with a venturi which draws air through the porous upper wing surface. The venturi is energized by a chemical propellant, which expands to create a pressure drop to draw the air in through the porous wing surface. The effect is relatively short lived, and is intended only to recover from a stalled condition having an extremely short duration. Litz, Jr. does not provide any form of movable surfaces, nor does he provide any means of selectively controlling suction or blown flow through opposite sides of a surface.

U.S. Pat. No. 3,448,714 issued on Jun. 10, 1969 to John D. Brooks, titled "Fin And Revolving Cylinder Bidirectional Steering Actuator," describes the use of rotating cylindrical leading and/or trailing edge devices installed in the fins of a submersible vessel. The resulting system is similar to the devices described in the U.S. Patents to Trey (leading edge device) and Tino (trailing edge device), discussed above, with a similar effect. Brooks recognizes the efficacy of such rolling leading and/or trailing edges, and their adaptability to marine use as well as aeronautical use. The present disclosure also recognizes the similarities and applications between aviation and maritime dynamics. However, Brooks is silent regarding any provision for moving the opposite surfaces of the fin itself, rather than only the leading and/or trailing edges, and for blowing or drawing air or other fluid through the surface.

U.S. Pat. No. 5,114,100 issued on May 19, 1992 to Peter K. C. Rudolph et al., titled "Anti-Icing System For Aircraft," describes various embodiments of a system for blowing heated air over the leading edge surfaces of a wing, primarily to melt ice and to prevent ice from forming on those surfaces. Rudolph et al. also note that their system can be used to draw air into the leading edge to promote laminar flow, as well. The present invention teaches away from any means for drawing air into or blowing air out of the leading edge, as this area is normally in an area of laminar flow in any event. The present invention provides means for producing an airflow through the surface behind the leading edge structure thereof, in combination with means for moving either or both the upper and lower surfaces. Rudolph et al. do not disclose any means of continually moving the surface of their wing at any location thereover.

U.S. Pat. No. 5,180,119 issued on Jan. 19, 1993 to Jean-Paul Picard, titled "Vertical Lift System Through Tangential Blowing Of Air Jets Channelled Over The Top Of Rotating Cylinders," describes a partially masked Magnus cylinder having an air jet blowing essentially tangentially thereover. A relatively small area of the cylinder is exposed, with the air jet blowing from the leading edge of this exposed area. The use of a Magnus cylinder having a fixed radius, is completely different from the plural moving belts of the present movable surface airfoil. In any event, Picard does not disclose any means for passing air through the surface of the Magnus cylinder.

U.S. Pat. No. 5,222,698 issued on Jun. 29, 1993 to Philip A. Nelson et al., titled "Control Of Boundary Layer Flow," describes a system utilizing acoustic sensors (microphones) disposed in a normally turbulent area to detect the sounds produced by turbulent flow. Passages are located upstream of the microphones, for drawing air therein to hold the boundary layer close to the surface in order to reduce turbulent flow. Suction is controlled by a program which is in turn actuated by turbulent flow detected by the microphones. No blowing of air through the passages is disclosed by Nelson et al., nor is any means for moving the surface(s) with or against the airflow, as provided by the present invention.

U.S. Pat. No. 5,263,667 issued on Nov. 23, 1993 to Raymond H. Horstman, titled "Perforated Wing Panel With Variable Porosity," describes the provision of a porous surface for drawing airflow therethrough, with the porosities varying in cross sectional area according to the air pressure over the surface at that given location on the surface. The structure used to provide the suction through the porosities is essentially the same as that disclosed in the '100 U.S. Patent to Rudolph et al. discussed further above, with the assignee for both the '100 and '667 U.S. Patents being the Boeing Company. As in the case of the '100 U.S. Patent to Rudolph et al., the '667 U.S. Patent does not disclose any means for continually moving any surface of an airfoil or plane, as provided by the present invention.

U.S. Pat. No. 5,366,177 issued on Nov. 22, 1994 to Steven P. DeCoux, titled "Laminar Control Apparatus For Aerodynamic Surfaces," describes a wing cuff assembly for removable installation upon an existing wing structure. The cuff assembly includes a plurality of channels therein, which communicate with the porous outer surface of the cuff to provide suction therethrough. Means are also provided within the cuff for controlling the suction through various areas of the porous surface. The Mitchell cuff assembly cannot provide the movable surface(s) of the present invention, due to its removable installation along the leading edge of an existing conventional wing structure.

U.S. Pat. No. 5,447,283 issued on Sep. 5, 1995 to Runyon H. Tindell, titled "Blown Boundary Layer Control System For A Jet Aircraft," describes a turbojet engine nacelle having a series of orifice areas for providing blown airflow at various areas within and without the nacelle. Air may be provided at the nacelle lip, within the duct, and/or over the afterbody of the nacelle, to control boundary layer turbulence at those locations as generated by different conditions of engine power, airspeed, and angle of attack of the nacelle. A computer is used to control the airflow, which is provided by the engine compressor. Tindell does not disclose any form of movable surface for the nacelle, either within or without the nacelle, nor does he disclose any boundary layer suction means, as provided by the present movable surface plane invention.

U.S. Pat. No. 5,590,854 issued on Jan. 7, 1997 to Solomon Shatz, titled "Movable Sheet For Laminar Flow And Deicing," describes a sheet having porous and nonporous areas, extending between a pair of rollers. The rollers are positioned so the sheet is disposed only over the upper forward portion of the airfoil, rather than about the majority of the upper and lower surfaces, as in the present invention. More importantly, the Shatz invention can only translate back and forth between the porous and nonporous areas, to provide for suction over this area of the wing or a smooth surface for laminar flow. As the two ends of the Shatz device are secured to opposed rollers, it cannot move continuously in a single direction, as provided by the present movable surfaces.

U.S. Pat. No. 5,772,156 issued on Jun. 30, 1998 to Pradip G. Parikh et al., titled "Aircraft Boundary Layer Control System With Discharge Transpiration Panel," describes a system wherein suction is applied to various aircraft surfaces (e.g., the upper surface of the wing), and discharged through a porous transpiration panel located in an area of turbulent flow in order to minimize drag produced by the injection of air into the slipstream. The discharge of airflow into the slipstream is incidental to the suction developed for boundary layer control and no direct control is provided of such airflow discharge, whereas the present invention includes control means for such discharge, as well as suction and control means therefor. Also, Parikh et al. do not provide any means for continuously moving the surface(s) of a plane, as provided by the present invention.

U.S. Pat. No. 5,791,601 issued on Aug. 11, 1998 to D. Stefan Dancila et al., titled "Apparatus And Method For Aerodynamic Blowing Control Using Smart Materials," describes a blown trailing edge surface wherein a spanwise duct provides airflow to a spanwise slot located on the upper surface of the airfoil adjacent the trailing edge thereof. Dancila et al. utilize an electrically actuated "smart" material which bends when electrically energized, to selectively move a shutter for opening and closing the trailing edge slot. No means for providing suction is disclosed by Dancila et al., nor is any means of moving any of the airfoil surfaces disclosed in the Dancila et al. '601 U.S. Patent.

U.S. Pat. No. 5,813,625 issued on Sep. 29, 1998 to Ahmed A. Hassan et al., titled "Active Blowing System For Rotorcraft Vortex Interaction Noise Reduction," describes a system wherein air may be selectively blown or drawn through the porous upper and lower forward surfaces of a helicopter rotor blade. While Hassan et al. state that the airflow may be cyclically controlled, depending upon the position of the rotor blade, no disclosure is made of any mechanism for controlling the airflow. In any event, Hassan et al. do not provide any form of movable surface for either the upper or lower surfaces of the airfoil. The present invention provides a selectively continuously movable upper and/or lower surface, in combination with a porous surface(s) and means for selectively controlling suction or outflow through the porous surface(s) for boundary layer control.

U.S. Pat. No. 6,109,565 issued on Aug. 29, 2000 to Lloyd H. King, Sr., titled "Air Craft Wing," describes a system wherein air is forced through a series of openings in the upper and lower surfaces of a wing, with the air being discharged rearward over the upper surface and forwardly beneath the lower surface. This has the effect of creating a higher velocity airflow over the upper surface, while slowing the velocity and increasing the pressure beneath the wing. The control and actuation means are only very generally disclosed, and do not appear to provide an enabling disclosure for those components. King, Sr. describes the openings or passages in the wing surfaces as being integrally formed with the fixed surfaces of the wing. No laterally movable surface for the wing is disclosed by King, Sr., as is provided by the present movable surface airfoil invention.

U.S. Pat. No. 6,142,425 issued on Nov. 7, 2000 to Erian A. Armanios et al., titled "Apparatus And Method For Aerodynamic Blowing Control Using Smart Materials," describes various alternative embodiments of the device disclosed in U.S. Pat. No. 5,791,601 to the same inventors, discussed further above. The '425 U.S. Patent is a continuation-in-part of the '601 U.S. Patent, and the same points of distinction between the disclosure of the '601 U.S. Patent and the present invention and noted in the discussion of the '601 U. S. Patent further above, are seen to apply here as well.

U.S. Pat. No. 6,216,982 issued on Apr. 17, 2001 to Juergen Pfennig et al., titled "Suction Device For Boundary Layer Control In An Aircraft," describes a system employing one or more venturis located within the bypass or other area of a turbofan engine. The venturi(s) produce a suction which draws air from the leading edge and/or upper surface of the wing, through porous panels affixed thereto. No means of selectively blowing air through the panels is possible, using the venturi system of Pfennig et al. Moreover, Pfennig et al. do not provide any means for moving the surface(s) of the wing, whereas the present invention includes both movable surfaces and means for drawing air or fluid through or discharging air or fluid from the porous moving surfaces.

British Patent Publication No. 233,083 accepted on May 7, 1925 to Hugh O. Short, titled "Improvements In And Connected With Sustaining Devices For Aircraft," describes several embodiments of rotary devices installed with airfoils. One of the embodiments discloses a single continuous belt surrounding the entire airfoil. However, Short does not provide for two separate and independent belts upon opposite surfaces of the airfoil, as provided by the present invention, nor does he disclose any means of controlling his roller or belt systems. Moreover, Short does not provide any means of drawing air through or blowing air from the surfaces of his wing. In contrast, the present movable surface plane invention provides such movable surface control means in addition to the various double belt embodiments and selective blowing or suction through the surfaces of the plane.

British Patent Publication No. 332,754 accepted on Jul. 31, 1930 to Filiberto de la Tour Castelcicala, titled "A Traveling Covering Apron Or The Like For Airplane Wings," describes a movable surface comprising a single belt which passes completely around the entire airfoil, excepting the control surfaces. While Castelcicala provides separate moving belts surrounding an aileron or flap at the trailing edge of the wing, he does not provide separate, independent movable surfaces for both the upper and lower surfaces of the wing or control surfaces, as provided by the present invention. Moreover, Castelcicala does not provide any means of drawing or blowing air through a porous movable airfoil or other plane surface, as provided by the present invention.

Italian Patent Publication No. 301,844 released on Oct. 13, 1932 to Eugenio Norzi illustrates a movable surface airfoil, with FIG. 3 showing separate belts over upper and lower wing surfaces. However, Norzi only discloses such belts on a wing; no suggestion is made of such a system for any aircraft control surfaces. Norzi illustrates only the forward fuselage and right wing in FIG. 5 of the drawings, with no illustrations being provided of any stabilizing or control surfaces. Moreover, Norzi indicates unidirectional movement of his moving surfaces, with both the upper and lower surfaces traveling in a forward direction, according to the directional arrows in the double surface airfoil of FIG. 3 and Norzi does not provide any form of blowing or suction flow through any of his airfoil surfaces, whereas the present invention provides both bidirectional belt movement and airflow through the surfaces.

French Patent Publication No. 1,053,332 published on Feb. 2, 1954 to Casimir Villedary illustrates various embodiments of a movable surface airfoil which is employed upon both the wings and horizontal control surfaces of an aircraft. While FIG. 4 apparently discloses a turbojet powered aircraft, it should be noted that the craft is equipped with straight (unswept) wings. This is apparent due to the single rectangular movable surface panel illustrated in that FIG., which appears to be normal to the fuselage at the wing root. Any suggestion of wing sweep would appear to be due to the perspective provided in the FIG. 4 drawing. Moreover, no suggestion is made of any means for controlling the speed of the moving belts, nor of any independent operation of the upper belt relative to the lower belt, as provided by the present system. Finally, Villedary does not disclose any means of blowing or drawing air through the moving surfaces.

European Patent Application No. 532,093 published on Mar. 17, 1993 to the Boeing Company, titled "Perforated Wing Panel With Variable Porosity," is a filing based upon U.S. Pat. No. 5,263,667, discussed further above, and claiming the priority thereof. The '667 U.S. Patent is directed to a porous surface through which a fluid may be drawn for controlling the boundary layer; no movable surfaces are disclosed. The above noted discussion of the differences between the '667 U.S. Patent and the present invention, is seen to apply to the disclosure of the '093 European Patent Publication as well.

Finally, the inventors are aware of various papers published in the field which relate generally to the concept of the present invention. In addition to various other rotating cylinder leading and trailing edge developments, a paper by Modi et al. published in vol. 3, nos. 1–4 of Fluid Dynamics Research on Sep. 1, 1988 describes research in bound vortex boundary layer control by means of a rotating leading edge cylinder. Another paper by Modi et al. published in vol. 18, no. 11 of the Journal of Aircraft on Nov. 11, 1981 describes experiments conducted on a Canadair CL-84 using rotating cylinder wing and flap leading edges. No disclosure is made by Modi or others of whom the present inventors are aware in any technical papers, of the use of two independent movable surfaces disposed upon opposite surfaces of an airfoil or plane, nor of any porous surfaces for passing airflow therethrough, as provided by the present movable surface plane invention.

None of the above inventions and patents, either singly or in combination, is seen to describe the instant invention as claimed.

SUMMARY OF THE INVENTION

The present invention comprises a plane having movable opposite surfaces, as in a fixed or rotary airfoil for an aircraft, supporting or control surface for an airborne missile, fan blade or the like, control surface for a submersible or other maritime craft, etc. The present movable surface plane includes two separate, independent movable surfaces, with one extending over the majority of the upper or first surface of the airfoil or plane and the other extending across the majority of the opposite surface. Either of the upper or lower surfaces may cover part or all of the wing leading edge. The two movable surfaces are independent of one another, with each being movable in the same or opposite direction and/or at the same or a different velocity than the other. In addition, at least one of the movable surfaces is porous, with the passages therethrough communicating with fluid ducts or the like within the plane structure. The ducts provide either suction or pressure, respectively for drawing air or other fluid into or blowing air or, other fluid outwardly from the structure, as desired.

By moving the upper surface (or surface about which a lower pressure is desired) in the same direction as that of the slipstream or fluid flow about the plane, and the opposite surface in a direction opposite the fluid flow, the moving surfaces tend to accelerate the fluid flow over the surface moving with the flow, thereby further reducing the pressure upon that surface. The result is a force urging the plane toward the surface with the reduced pressure. The present movable surfaces are also operable on symmetrical surfaces with a zero angle of attack, due to the difference in velocity and thus pressure differential developed. However, they are advantageously applied to asymmetrical planes operating at some positive angle of attack, to provide even greater force than would be developed conventionally. Moving either of the upper or lower surfaces in the flow direction will lower drag by reducing shear stress.

The present disclosure also describes in general control and power means for operating the present movable surfaces, and various airfoil (or more generally, plane) configurations, such as tapered plan forms, swept configurations, etc., to which the present movable surfaces are adaptable. Power and control means for the suction or blowing of fluid through the porous surfaces, are also disclosed.

Accordingly, it is a principal object of the invention to provide an improved movable surface plane including movable surfaces disposed over the majority of a first and opposite second surface of the plane.

It is another object of the invention to provide an improved movable surface plane in which the movable surfaces may be actuated independently of one another to travel in the same or opposite directions and at the same or different velocities, as desired.

It is a further object of the invention to provide an improved movable surface plane adaptable for use with fixed and rotary wing aircraft (e.g., aerospace vehicles and helicopters), atmospheric missiles, submersible and other maritime vessels, stationary fans and windmills, and other fluid dynamic applications where differential pressure upon opposite sides of a lifting surface, control surface, or other surface is desired.

An additional object of the invention is to provide an improved movable surface plane including means for powering and actuating such surfaces.

Still another object of the invention is to provide an improved movable surface plane including means for controlling such surfaces for use as control devices for aircraft and marine craft.

Yet another object of the invention is to provide an improved movable surface plane including at least one porous surface and means for blowing or drawing a fluid through the porous surface for control of boundary layer flow over the surface.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

FIG. 4 is an elevation view in section of a laminar flow plane incorporating the present invention, with maximum thickness toward the rearward portion of the plane.

FIG. 5 is an elevation view in section of an asymmetrical plane incorporating the present movable and porous surfaces.

Similar reference characters denote corresponding features consistently throughout the attached drawings.

DETAILED DESCRIPTION OF THE PREFERRED EMBODIMENTS

The present invention comprises various embodiments of a plane (e.g., aircraft wing, control surface for a marine vessel, etc.) having a porous moving surface on at least one side thereof, and preferably having independently movable porous surfaces on opposite sides thereof. These movable surfaces comprise endless belts which may be rolled to travel either with or against the fluid flow (slipstream, water flow, etc.) as desired, and which pass fluid flow therethrough by means of suitable motors and pumps. By moving a first belt so that its outer surface, comprising the surface of the plane, is traveling with the fluid flow about the plane, the fluid is entrained and drawn along the surface to accelerate its velocity relative to the surface, thus reducing the lateral pressure of the fluid upon that surface. Conversely, by moving the opposite second surface belt so that its outer surface is traveling against the fluid flow, the flow is slowed, thereby increasing its lateral pressure against the surface. This pressure differential due to the differential belt movement and speed results in differential forces upon the plane, to produce lifting and/or directional forces as desired. Also, moving the surface in the direction of flow will result in reduction of shear stress. Thus, drag forces may also be controlled. The provision of suction or blowing through the porous surface(s) provides further performance gains by controlling the fluid boundary layer adjacent to the surface.

Figure 1A:
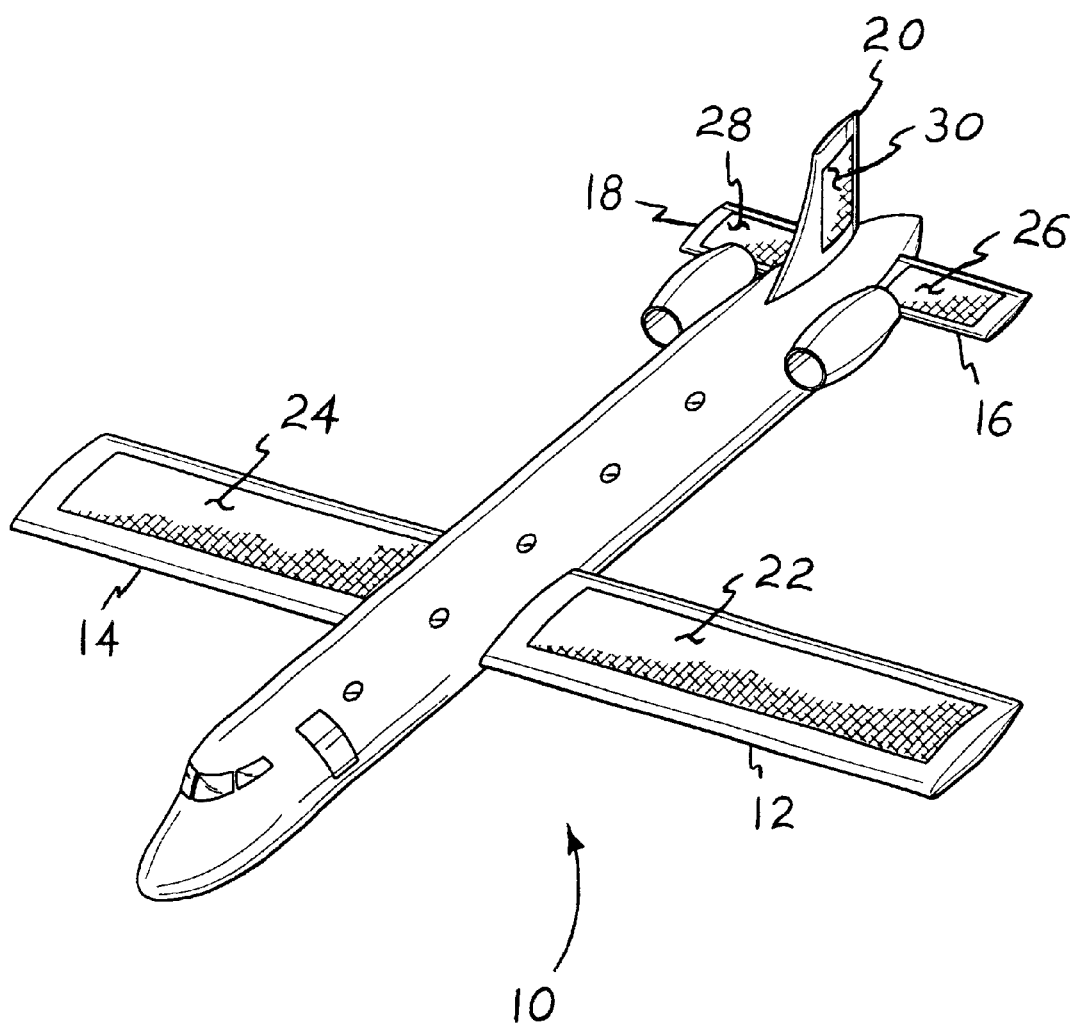
FIG. 1A is a perspective view of an exemplary light twin turbojet aircraft incorporating the present movable surface plane invention with the primary lifting surfaces and with horizontal and vertical control surfaces.

FIG. 1A illustrates the general concept of a first embodiment of the present invention, as applied to a light corporate jet aircraft 10 or the like. The aircraft 10 of FIG. 1 includes opposite left and right wing panels or planes, respectively 12 and 14, opposite horizontal pitch control or tail panels or planes, respectively 16 and 18, and a vertical tail panel or plane 20 for yaw control. Each of these panels or planes 12 through 20 includes a single movable surface, respectively 22 through 30, disposed over each of the two opposite sides thereof.

Figure 1B:
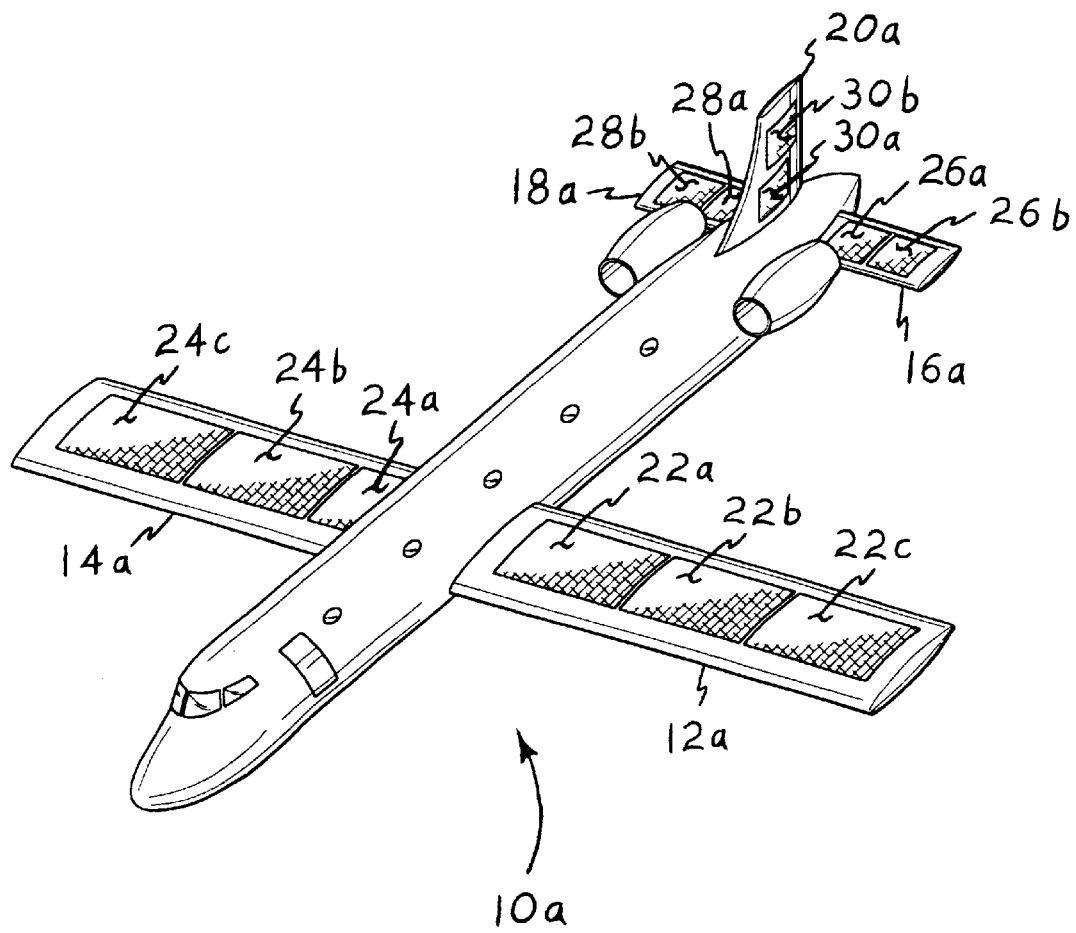
FIG. 1B is a perspective view of an aircraft similar to that of FIG. 1, but incorporating plural movable surfaces in each horizontal and vertical plane.

FIG. 1B illustrates a variation on the embodiment of FIG. 1A, wherein an aircraft 10a having left and right wing and tail panels or planes and a vertical tail plane, respectively 12a through 20a, includes a plurality of movable surfaces installed within each of the planes 12a through 20a. The left wing 12a includes a series of separate and independently movable upper surfaces, respectively 22a through 22c from inboard to outboard, with the right wing 12b having a like series of separate independently movable upper surfaces 24a through 24c extending from the inboard end of the wing 12b to its outboard end. Similarly, the two horizontal tail planes 16a and 18a each include a pair of movable upper surfaces, respectively 26a and 26b for the left plane 16a and 28a and 28b for the right plane 18a. The vertical tail plane 20a is configured in a similar manner, having two movable surfaces 30a and 30b. The various movable surfaces 22 through 30 of the aircraft 10 of FIG. 1A and surfaces 22a through 30b of the aircraft 10a of FIG. 1B may be provided with a series of air passages therethrough, to provide suction or blowing airflow as desired.

Figure 8:
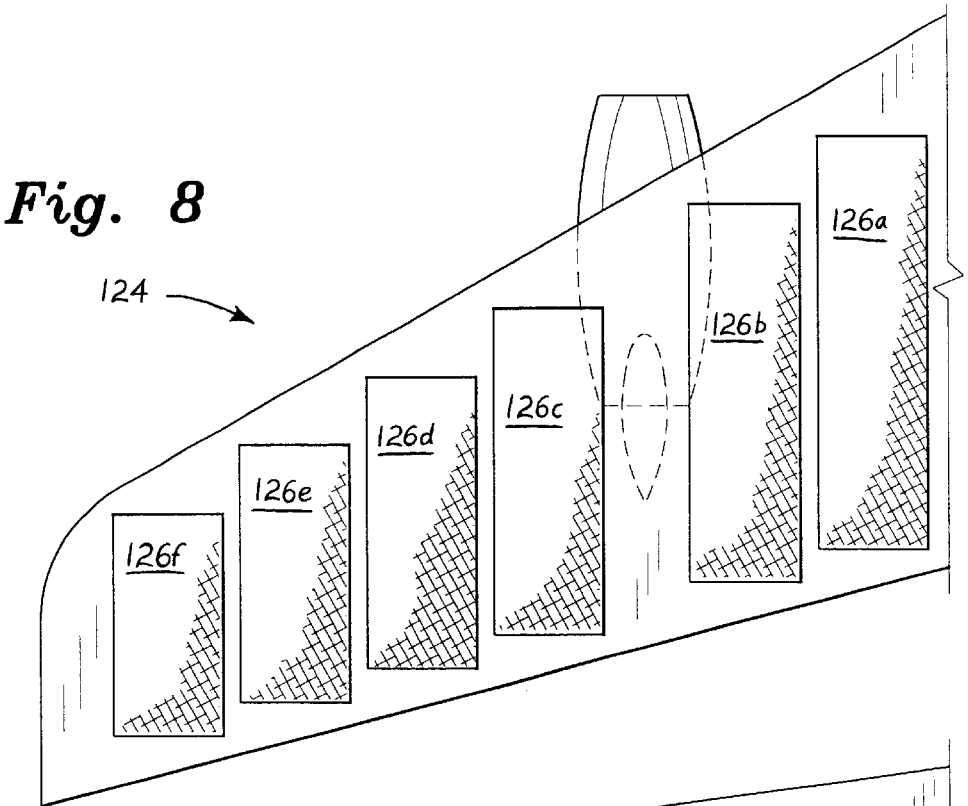
FIG. 8 is a top plan view of a swept wing or plane incorporating a series of staggered movable surfaces.

It will be noted that none of the various planes or airfoils 12 through 20 of the aircraft 10 of FIG. 1A, nor the airfoils 12a through 20a of the aircraft 10a of FIG. 1B, includes any form of conventional hinged control surface extending therefrom. This is due to the advantages provided by the present invention, in that the differential movement of opposite surfaces on a given plane in combination with selective blowing and suction, and the resulting differential pressures and forces, may be used to produce the varying forces required for lift and stability in flight. While control surfaces may be provided in combination with the present movable surfaces, as shown in the embodiment of FIG. 8 of the drawings, they are not necessarily required.

The present movable surface plane invention may provide control for an aircraft about its yaw, pitch, and roll axes, as well as providing the additional generation of lifting force through the general principle described further above. For example, the aircraft 10 of FIG. 1A may use the present movable surfaces to perform a roll to the right to initiate a right turn. The rearward velocity of the upper left movable surface 22 may be increased to decrease the pressure thereover, while decreasing the rearward velocity (or increasing the forward velocity) of the opposite upper right surface 24 to increase the pressure thereover. The lower pressure over the left wing panel 12 and higher pressure over the right wing panel 14, results in the left wing panel 12 rising while the right wing panel 14 is forced to descend, thus rolling into a right bank to turn to the right.

The multiple independent movable surfaces of the aircraft 10a of FIG. 1B may be operated in a similar manner. However, it may not be necessary to produce a differential velocity in all of the surfaces of a given panel. For example, a roll to the right for the aircraft 10a of FIG. 1B may be executed by providing differential velocities for only the outermost surfaces 22c and 24c, respectively of the left and right wing panels 12a and 14a. The remaining movable surfaces 22a, 22b and 24a, 24b may remain at their initial velocities during the maneuver. However, the multiple movable surfaces of the aircraft 10a provide the option of using all of the surfaces of a given plane or panel to produce the desired maneuver, if the aircraft control system is so configured.

Figure 2:
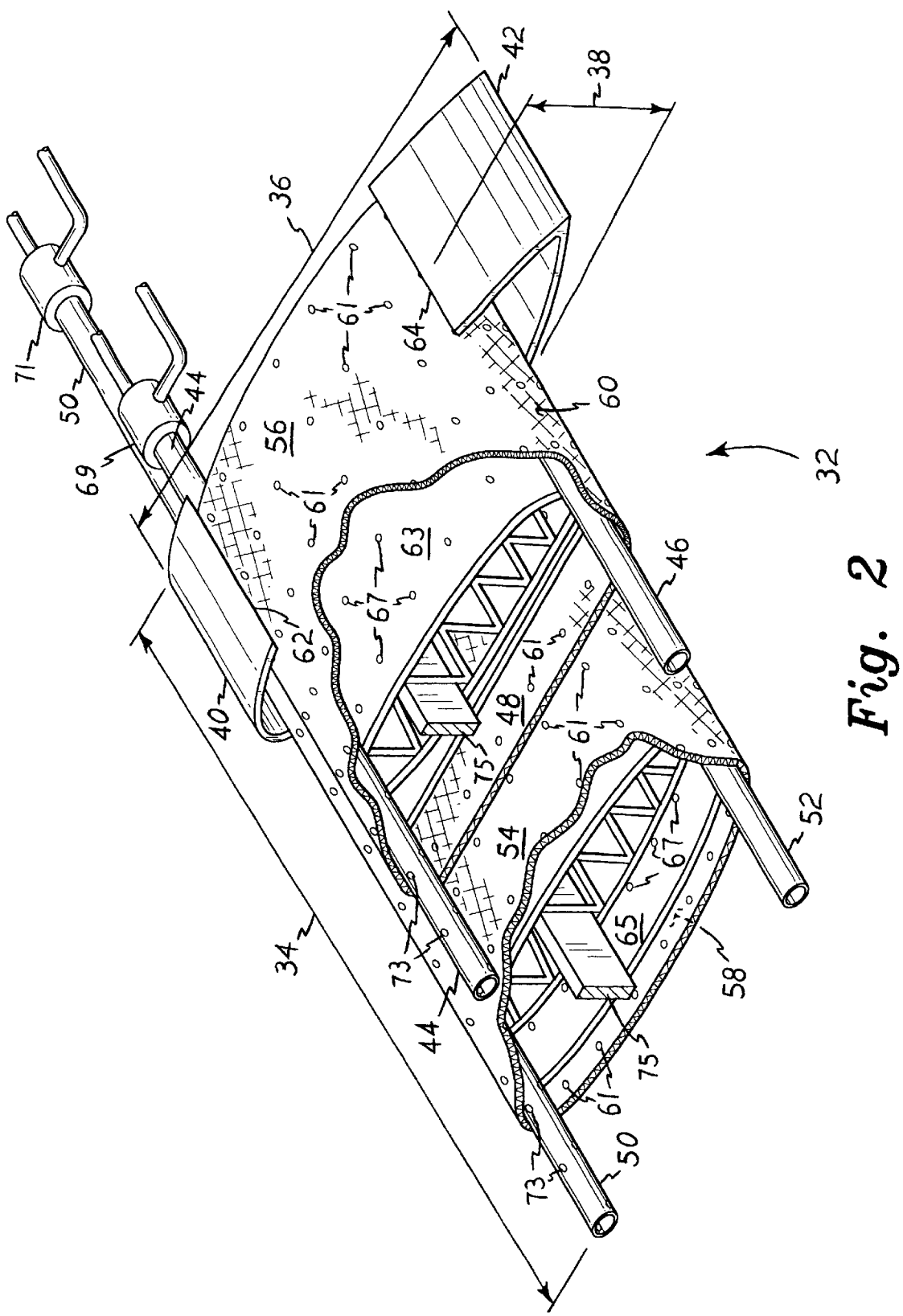
FIG. 2 is a perspective view in section of an exemplary plane, showing the means for moving the two opposite surfaces and their general arrangement within the plane, as well as the porous surfaces and means for passing air through those surfaces.

While only a single side of each of the planes 12 through 12 is shown in FIG. 1A, FIGS. 2 through 5 illustrate the two opposite surfaces of a series of embodiments of planes having the independently movable surfaces of the present invention. FIG. 2 provides a more detailed broken away perspective view of the general configuration of the present invention. In FIG. 2, an airfoil (or fluid foil) structure 32 having a span 34, a chord length 36, a thickness 38, a leading edge 40, and a trailing edge 42 opposite the leading edge 40, is provided with a series of rollers disposed within the structure 32. Forward and rearward first surface rollers, respectively 44 and 46, have a first surface belt 48 extending therearound, with forward and rearward second surface rollers, respectively 50 and 52, having a second surface belt 54 extending therearound.

The two belts 48 and 54 are endless, i.e., each defining a closed loop or band when viewed from one end thereof. Belts 48, 54 rotate or travel around their respective rollers 44, 46 and 50, 52, with one or both of the rollers providing rotary power to drive the belts 48 and 54 therearound. Thus, each belt 48 and 54 will always have an outwardly disposed portion, with the outer portion 56 of the first belt 48 defining a first outer surface for the plane structure 32, and the outwardly disposed portion 58 of second belt 54 defining the opposite second outer surface for the structure 32.

The outer surfaces 56 and 58 defined by the two belts 48, 54 extend across most of the chord 36 of the structure 32, depending upon the diameter and location of the rollers and thickness of the structure, etc. The belts 48 and 54 are preferably formed of a very flexible yet durable and resilient material, such as a rubberized, plasticized, or otherwise coated woven natural or synthetic fabric or fiber material of some sort. Such materials are conventional, and well known in the aviation and maritime industries for various other purposes and functions. Such material may have at least a slightly roughened surface, if desired, due to the weave or texture of the fabric or fiber material from which it is formed. Such a roughened texture, as indicated by the texture 60 of the belts 48 and 54 of FIG. 2 and shown in other drawing Figures, may be advantageous in the operation of the present invention, by providing a surface roughness which assists in entraining the boundary layer of air (or other fluid) immediately adjacent to the outer surfaces 56 and 58 of the structure 32.

It will be understood that the various panels and planes illustrated with the aircraft 10 and 10a of FIGS. 1A and 1B, may be configured generally in accordance with the plane structure 32 of FIG. 2, i.e., having two opposite independently movable surfaces, although only a single side of each panel or plane is shown for the aircraft 10 and 10a of FIGS. 1A and 1B. Also, while only a single first and second belt 48 and 54 is shown in FIG. 2, it will be seen that the same general configuration is adaptable to multiple belts, as in the aircraft 10a of FIG. 1B. Alternatively, a single belt and roller system serving as a single surface, or as both surfaces, may be provided in accordance with the present invention, if so desired.

The belts 48 and 54 are preferably porous, including a large number of relatively small diameter holes or passages 61 therethrough. These porosities 61 allow the flow of air (or other fluid, in the case of non-aircraft structures) therethrough, whereby the boundary layer flow immediately adjacent the belts 48 and 54 may be affected and controlled. First and second support plates, respectively 63 and 65, are installed immediately beneath each belt outer surface 56 and 58, and maintain the desired airfoil contour. The support plates 63 and 65 are also porous, including a series of fluid flow passages or holes 67 therethrough. These support plate passages 67 are in selective registry with the holes or passages 61 of the two belts 48 and 54, depending upon the position(s) of the belt(s) 48 and 54. When the belts are positioned so that the belt passages 61 are aligned with the support plate passages 67, on either or both surfaces, airflow may be provided through the plate and belt passages 67 and 61 to affect and control airflow immediately adjacent to the surfaces 56 and 58. Alternatively, positioning the belt(s) 48 and/or 54 so that their passages 61 are not aligned with the corresponding plate passages 67, effectively shuts off any appreciable flow through the passages 61 and 67.

Pneumatically driven motors 69 and 71 may be provided to drive the respective rollers 44 and 50, with control valving (discussed further below) provided to control the direction of rotation and velocity of the motors 69 and 71. Other motive power may be provided as desired, e.g., hydraulic, electric, engine driven, etc. as desired. The motors 69 and 71 may be powered by bleed air from one or more stages of the compressor(s) of the turbine engine(s) used to power the aircraft, or by other means as desired. The exhaust air from the pneumatic motors 69 and 71 may be ducted through the respective rollers 44 and 50, which are provided with a series of passages or holes 73 therethrough. Airflow from the motors 69 and 71 thus passes through the interiors of the rollers 44 and 50 to exit the roller passages 73 and enter the interior of the airfoil structure 32. From the airfoil interior, the air passes outwardly through the support plate passages 67 and through the belt passages 61, assuming the passages 61 and 67 are aligned with one another. It will be seen that the motors 69 and 71 may be powered by airflow drawn from the roller tubes 44 and 50, with air drawn from the motors 69 and 71 from another source (venturis, vacuum pumps, etc.) if so desired. By drawing air through the roller tubes 44 and 50, air is drawn through the support plate and belt passages 67 and 61, thereby drawing air from the upper and lower surfaces 56 and 58 of the airfoil.

While the present double belt system of providing independent moving surfaces for a panel or plane results in some loss of interior space within the panel, it will be seen that sufficient volume exists for structure especially configured for use with the present invention. For example, double spanwise spars 75 may be provided, with interconnecting webs located at gaps between multiple panels of a surface, as in the aircraft 10a of FIG. 1B. Sufficient volume exists within the core of each belt 48 and 54 for the installation of fuel tanks and other structure, as well. Also, the present movable surfaces also provide for some additional aerodynamic improvement in efficiency, by providing suction in the gap 62 between the leading edge 40 and the first (or upper, in a wing) surface 56 of the belt 48, and perhaps in the gap 64 between the trailing edge 42 and the first surface 56, and/or the opposite second surface 58, if so desired.

Figures 3A, 3B:
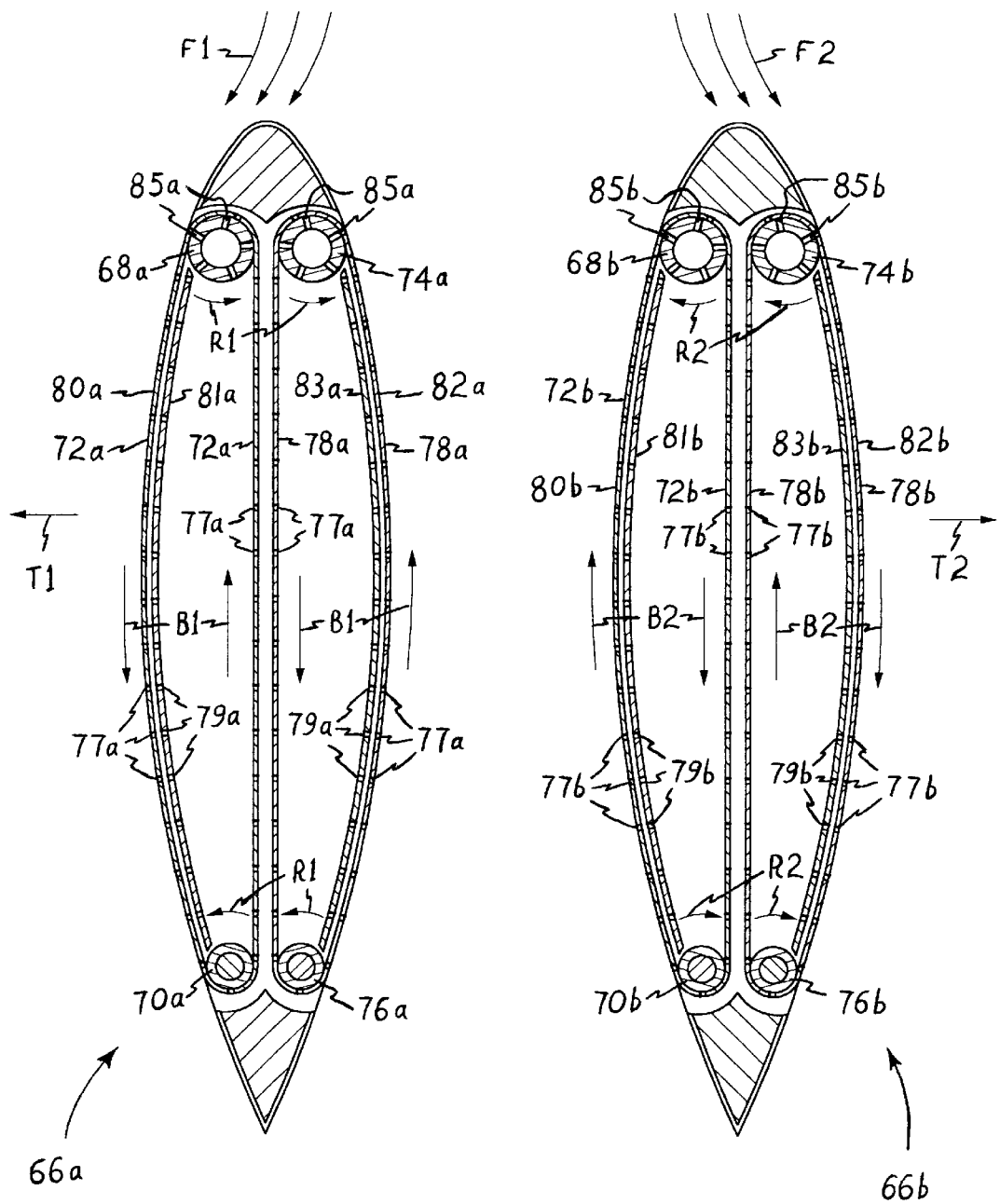
FIG. 3A is an elevation view in section of an exemplary plane, showing the force developed away from the surface which is moving in the direction of fluid flow and the mechanism for drawing or blowing air through the surfaces.
FIG. 3B is an elevation view in section of the plane of FIG. 3A, showing surface movement and resulting force being developed in the opposite direction to that of FIG. 3A.

FIGS. 3A and 3B provide a clearer and more detailed illustration of the operation of the present movable surface planes. While the planes of FIGS. 3A and 3B are shown in a vertical orientation relative to the drawing sheet, with forces being developed generally normal to the major dimension of the planes, it should be understood that the orientation is not critical, and the planes illustrated in FIGS. 3A and 3B may be oriented in any direction desired, to produce a lifting force, a downward force, or forces to the left or right, as viewed relative to the orientation of the drawing sheet.

The plane structure 66a of FIG. 3A includes forward and rearward first surface rollers, respectively 68a and 70a, with an endless first belt 72a extending therearound. Adjacent forward and rearward second surface rollers, respectively 74a and 76a, have an endless second belt 78a extending therearound. The outwardly disposed portion of the first belt 72a defines an outer first panel or plane surface 80a, with the outwardly disposed portion of the second belt 78a defining an opposite outer second panel or plane surface 82a. Rotary power for rotating the two belts 72a and 78a is provided by their respective first and/or second rollers, as in the case of the other moving surface panels or planes of FIGS. 1A through 2, discussed further above.

In FIG. 3A, all of the rollers 68a, 70a, 74a, and 76a are rotating counterclockwise, as indicated by the rotational arrows R1, with the movement of the belts 72a and 78a also rotating counterclockwise about the rollers, as indicated by the belt movement arrows B1. It is assumed that the plane or panel 66a is moving toward the top of the drawing sheet, with the relative wind or flow being downward toward the leading edge of the panel 66a, as indicated by the flow arrows F1. The outer surface 80a of the first belt 72a is thus moving rearwardly relative to the direction of travel of the plane 66a, with the opposite outer surface 82a of the second belt 78a moving forwardly in the direction of travel, as indicated by the belt movement arrows B1.

The entrainment of fluid over the outermost first surface 80a of the first belt 72a by the rearward movement of that surface draws the fluid flow F1 toward that surface in accordance with the circulation theory of fluid flow about a plane or fluid foil. This results in the acceleration of flow over the first surface 80a, thus producing a reduction in the lateral pressure of the fluid upon the first surface 80a of the plane 66a. Conversely, the opposite outermost surface 82a is moving forwardly relative to the fluid flow, thus slowing the fluid flow on that side of the plane or panel 66a, resulting in a relatively greater fluid pressure on the second surface 82a. This differential pressure between the two opposite outer surfaces 80a and 82a, results in a force or thrust T1 in a direction from the second (forwardly moving) surface 82a toward the first (rearwardly moving) surface 80a, as indicated by the thrust arrow T1. It should be noted that either of the upper and lower surfaces may move with or opposite the direction of flow at different speeds, to improve the lift to drag ratio (aerodynamic performance).

FIG. 3B illustrates a similar fluid foil or plane 66b having forward and rearward first surface rollers, respectively 68b and 70b, an endless first belt 72b extending therearound, adjacent forward and rearward second surface rollers, respectively 74b and 76b, with an endless second belt 78b extending therearound. The outwardly disposed portion of the first belt 72b defines an outer first panel or plane surface 80b, with the outwardly disposed portion of the second belt 78b defining an opposite outer second panel or plane surface 82b. Rotary power for rotating the two belts 72b and 78b is provided by their respective first and/or second rollers in the manner discussed further above.

In FIG. 3B, all of the rollers 68b, 70b, 74b, and 76b are rotating clockwise, as indicated by the rotational arrows R2, with the movement of the belts 72b and 78b also rotating clockwise about the rollers, as indicated by the belt movement arrows B2. As in the case of the plane 66a of FIG. 3A, it is assumed that the plane 66b is moving toward the top of the drawing sheet, with the relative wind or flow being downward toward the leading edge of the panel 66b, as indicated by the flow arrows F2. The outer surface 80b of the first belt 72b is thus moving forwardly relative to the direction of travel of the plane 66b, with the opposite outer surface 82b of the second belt 78b moving rearwardly in the direction of travel, as indicated by the belt movement arrows B2.

The outer surface 80b of the first belt 72b is moving forward relative to the flow, thus slowing the flow on that side of the plane 66b, resulting in an increase in the fluid dynamic pressure on the first surface 80b of the plane 66b. The entrainment of fluid over the outermost surface 82b of the second belt 78b by the rearward movement of that surface draws the flow F2 toward that surface in accordance with circulation theory, as noted above. This accelerates the flow over the second surface 82b to produce a reduction in the lateral pressure of the fluid upon the second surface 82b of the plane 66b. This differential pressure between the opposite outer surfaces 80b and 82b, results in a thrust T2 in a direction from the first (forwardly moving) surface 80b toward the second (rearwardly moving) surface 82b as indicated by the thrust arrow T2, opposite the thrust T1 of plane 66a of FIG. 3A.

While the above described function and operation of the opposed belts 72a (and 72b) and 80a (and 80b) describe those belts as having forward and rearward motion, it should be understood that this motion is only relative to the two belts in a given plane. In other words, one belt may have a rearward motion in the direction of flow, but with its outermost surface still moving against the direction of flow, while the opposite belt may also have such rearward motion, but at a greater or lesser velocity than the first belt. Conversely, the two belts may be moving forwardly relative to the direction of travel of the plane, but at different velocities. The present invention also provides for the stoppage of one of the belts, and the forward (or rearward) movement of the opposite belt, if so desired. The critical feature of the present movable surface planes, is that some differential in velocity be provided between the two opposed belts to produce a difference in lateral pressure upon the two opposed surfaces of the plane. The specific differential velocities and/or direction of rotation of the two opposed belts, may be varied or adjusted as desired to achieve the desired effect.

As in the case of the airfoil of FIG. 2, the belts and roller tubes of the airfoils of FIGS. 3A and 3B also include porosities or passages therethrough. The belts each include a series of passages therethrough, respectively 77a and 77b for the respective belts 72a, 78a and 72b, 78b of FIGS. 3A and 3B. These passages communicate with respective passages 79a and 79b formed through the respective first and second surface support plates 81a, 81b and 83a, 83b of FIGS. 3A and 3B. Roller tube passages 85a and 85b are also provided through the first and second forward rollers 68a, 68b and 74a, 74b of FIGS. 3A and 3B. The airflow through the various passages operates as described further above for the airfoil of FIG. 2, with suitable motors and pumps passing air into or drawing air from the roller tubes 68a, 68b and 74a, 74b, with air flowing through the passages 77a, 77b of the belts 72a, 72b and 78a, 78b and passages 79a, 79b of the first and second support plates 81a, 81b and 83a, 83b when those passages 77a, 77b are aligned with the corresponding passages 79a, 79b.

The airfoil or fluid foil cross sectional shapes of the planes 66a and 66b of FIGS. 3A and 3B, are illustrated as being generally conventionally symmetrical in shape. However, it will be seen that the present movable surfaces may be adapted to any practicable symmetrical or asymmetrical airfoil or fluid foil shape, as desired. FIGS. 4 and 5 illustrate further exemplary shapes for such airfoils or fluid foils.

The fluid foil 66c of FIG. 4 includes essentially the same basic components as the fluid foils 66a and 66b of FIGS. 3A and 3B, i.e., forward and rearward first surface rollers 68c and 70c with a first surface belt 72c extending therearound and defining an outermost first surface 80c, and forward and rearward second surface rollers 74c and 76c with a second surface belt 78c extending therearound and defining an outermost second surface 82c. First and second surface support plates, respectively 81c and 83c, are placed within the structure 66c, with the plates each including a plurality of fluid flow passages 79c therethrough. The belts 72c and 78c also include a plurality of flow passages 77c therethrough, with the roller tubes 68c and 74c also having flow passages 85c formed through the walls thereof, to provide for fluid flow through the movable surfaces 80c and 82c.

The fluid foil 66d of FIG. 5 is similarly structured, having forward and rearward first surface rollers 68d and 70d with a first surface belt 72d extending therearound and defining an outermost first surface 80d, and forward and rearward second surface rollers 74d and 76d with a second surface belt 78d extending therearound and defining an outermost second surface 82d. First and second surface support plates, respectively 81d and 83d, are placed within the structure 66d, with the plates each including a plurality of fluid flow passages 79d therethrough. The belts 72d and 78d also include a plurality of flow passages 77d therethrough, with the roller tubes 68d and 74d also having flow passages 85d formed through the walls thereof, to provide for fluid flow through the movable surfaces 80c and 82c.

However, the cross sectional shapes of the two planes 66c and 66d, differ from the shapes of other planes discussed to this point. The plane 66c has a (somewhat exaggerated) maximum thickness distribution located about 60% rearwardly from the leading edge, in the manner of the classic laminar flow airfoil shape. The plane 66d has a generally flat second outer surface 82d with a curved first outer surface 80d, in the manner of a conventional asymmetrical airfoil, e.g., Clark "Y", USA 35B, etc. Any practicable airfoil shape may be achieved with the present movable surfaces, by means of appropriately shaped ribs, guides, and other structure as exemplified in e.g., U.S. Pat. No. 1,785,300 to de la Tour Castelcicala, noted in the Description of the Related Art further above; other means may also be used.

Figure 6:
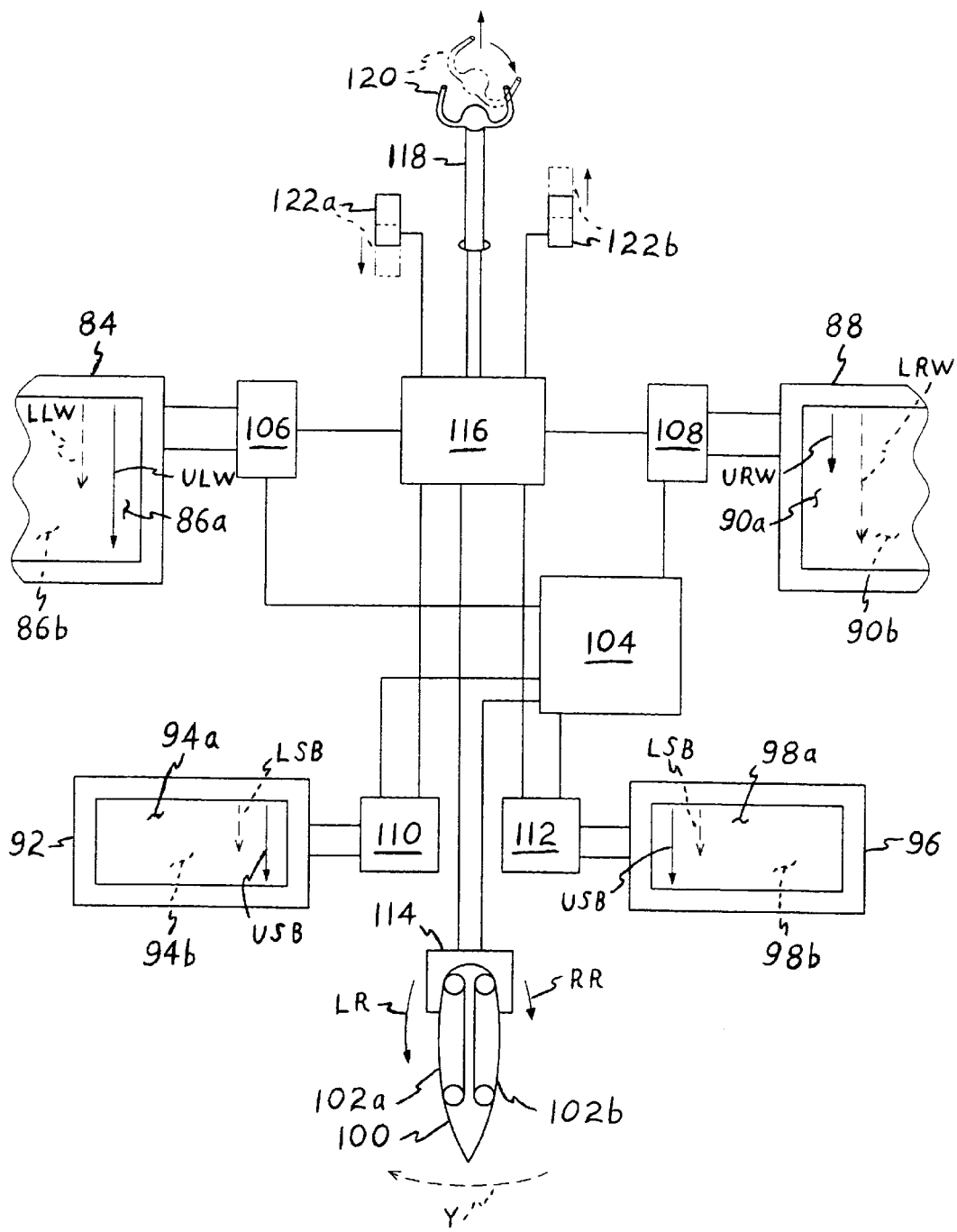
FIG. 6 is a schematic drawing of an exemplary aircraft control system adaptable to the present movable surface plane invention, showing control means for yaw, pitch, and roll.

FIG. 6 provides a schematic illustration of the means which may be used to power and control the movable surface planes of the present invention. The schematic view of FIG. 6 generally illustrates a top plan view of an aircraft incorporating the movable surfaces of the present invention; it will be seen that the incorporation of the present movable surfaces to a maritime vessel in which only yaw control (or perhaps yaw and pitch control, in the case of a submersible vessel) is trivial and easily accomplished in comparison to the three axis control system required for aircraft.

The aircraft system of FIG. 6 includes a left wing panel 84 including upper and lower movable surfaces, respectively 86a and 86b, and an opposite right wing panel 88 including upper and lower movable surfaces, respectively 90a and 90b. The left and right horizontal stabilizers are similarly indicated, with the left stabilizer 92 having upper and lower movable surfaces 94a and 94b and the right stabilizer 96 having upper and lower movable surfaces 98a and 98b. The vertical stabilizer or fin 100 includes opposite movable surfaces 102a and 102b.

A power source 104 (e.g., turbine bleed air, hydraulic pump(s) driven by one or more engines, separate combustion engines, etc.) communicates with at least one rotary motor (pneumatic, hydraulic, etc., depending upon the power source), respectively motors 106 through 114 for each of the surfaces 84, 88, 92, 96, and 100. Each motor 106 through 114 preferably drives at least one roller for each movable surface in each plane, although a separate motor may be used to drive each movable surface in a given plane, if required for example in the larger surfaces. The motors 106 through 114 are preferably reversible (although separate motors and one way clutches could be provided for each direction of rotation, if desired) and variable in speed, in order to provide the differential in relative velocity between the movable surfaces and the relative wind, and thus the differential pressures required for the operation of the present invention.

Each motor 106 through 114 is controlled by at least one central computer 116 (a series of computers is preferably provided, for redundancy), which is in turn controlled by the flight controls of the aircraft. Conventional flight controls comprise a control column 118 for pitch control and a yoke or wheel 120 mounted thereon for roll or bank control (or control stick incorporating both functions). Left and right rudder pedals 122a and 122b are provided for yaw control. Each of these controls 118 through 122b communicates with the appropriate motor by means of the computer 116, thereby controlling the speed and/or direction of rotation of each motor 108 through 114 in accordance with control input.

As an example of the above, an aircraft incorporating the above described control system is placed in a descending right turn. The control column 118 is moved forward, sending a signal to the computer 116. The computer 116 commands the upper and lower surfaces 94a, 94b and 98a, 98b respectively of the left and right stabilizer planes 92 and 96, to adjust their velocities to reduce the downforce being developed thereby (as is conventional in airplanes for the maintenance of pitch stability) to allow the empennage to rise and the nose of the aircraft to descend. This is accomplished by slowing the rearward motion of the two lower surfaces 94b and 98b, as indicated by the shorter lower stabilizer belt movement arrows LSB shown in broken lines, and/or increasing the rearward velocity of the two upper surfaces 94a and 98a, as indicated by the two longer upper stabilizer belt movement arrows USB shown in solid lines. The net result of the above control input is to reduce the downforce and/or increase the lifting force being developed by the stabilizer 92, 96, causing the tail to rise and the nose to descend.

It will be appreciated that the present control system may also include input to the moving surfaces 86a, 86b and 90a, 90b of the wing planes 84 and 88 to accomplish the above function, by reducing the total lifting force being developed. This is accomplished by reducing the velocity of the upper belt and/or increasing the velocity of the lower belt in the wing planes 84 and 88, as described further above. Also, it will be noted that the present system is applicable to canard type airplanes having their horizontal stabilizer surfaces positioned forwardly of the wings, using the same inputs as provided for the wings of a conventional aircraft for the descending maneuver, if such wing control is used. In aircraft where the rearward horizontal stabilizing surfaces produce a lifting force, the present system may be adapted in the manner noted above for controlling forward canard planes.

When the control yoke 120 is turned to the right, as shown in broken lines in FIG. 6, to initiate a roll or bank to the right, a signal is sent to the computer to decrease the lifting force on the right wing 88 and/or increase the lifting force on the left wing 84. This is accomplished as described above, by increasing the velocity of the upper or first belt 86a and decreasing the velocity of the lower or second belt 86b of the left wing 84, as indicated by the relative lengths of the upper and lower left wing belt or surface arrows ULW and LLW, thus creating a greater pressure differential toward the first or upper surface 86a and lifting the wing 84. The reverse actuation of the upper and lower belts or movable surfaces 90a and 90b is accomplished for the right wing 88, as indicated by the shorter upper right wing velocity arrow URW and the relatively longer lower right wing velocity arrow LRW, to reduce the net lifting force on the right wing to roll the aircraft to the right. The above described means for changing the lifting forces of the two wings 84 and 88 may be accomplished simultaneously, or may be applied to either wing alone if desired.

The two opposed surfaces 102a and 102b of the vertical plane 100 are adjusted in velocity to control the aircraft yaw during the maneuver. It will be appreciated, however, that the present system of producing differential lift of the two wings 84 and 88 results in relatively little adverse yaw, whereas the use of conventional ailerons normally results in some adverse yaw. Thus, very little rudder control is likely to be needed with the present system.

Assuming that some right yaw is required along with the right bank or roll, the right rudder pedal 122b is depressed, as indicated by its forward position shown in broken lines. (The left pedal 122a may simultaneously move rearwardly, as indicated in the drawing Figure.) The depression of the right pedal 122b results in a signal being sent to the computer 116, which in turn sends a signal to the vertical surface motor (or motors) 114 to increase the rearward velocity of the left belt or surface 102a, and/or decrease the relative velocity of the right belt or surface 102b, as indicated by the relative lengths of the left rudder and right rudder arrows LR and RR in FIG. 6. The result is a differential force acting to the left, as indicated by the yaw arrow Y.

While the above description of maneuvering using the present system discussed only control inputs for performing a descending right turn, any conventional maneuver which may be achieved using conventional aileron, elevator, and rudder control surfaces may be accomplished using the present movable surfaces. It should also be noted that any one-or more of the belts of a given surface may be involved in maneuvering, and that not all of the belts in a surface may be needed for a maneuver. The wings 84 and 88 may also be controlled to increase lift simultaneously and enhance lift-to-drag ratio, thereby enabling the aircraft to fly more slowly for takeoffs, approaches, and landings, thus requiring shorter runway length and reducing fuel consumption. Also, the improved aerodynamic (and hydrodynamic) performance aids in the control of aircraft (and ships, etc.) at relatively low speeds. The present movable surfaces serve to entrain the airflow over the relatively lower pressure side or surface of an airfoil, which may enable an aircraft so equipped to fly at higher angles of attack than may be achieved with conventional airfoils and control surfaces.

Figure 7:
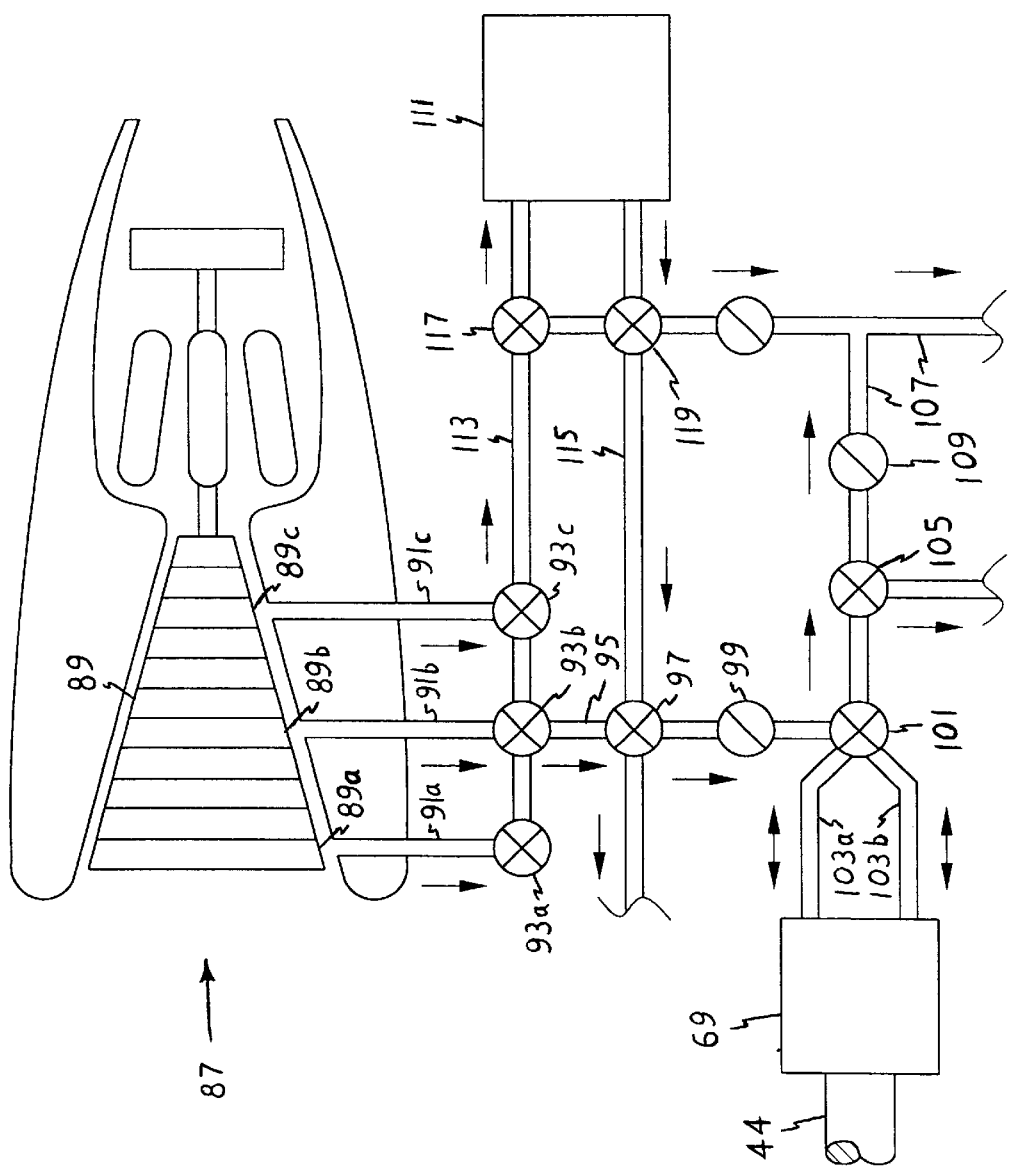
FIG. 7 is a schematic drawing of an exemplary system for providing airflow under suction or pressure for the porous moving surfaces of the present invention.

FIG. 7 illustrates a schematic diagram for providing and controlling airflow through the porous surface(s) of the moving belts of the present invention. In FIG. 7, a turbine engine 87 (which may be a turbojet, turbofan, or turboprop engine) provides bleed air from one of three stages 89a, 89b, and 89c of the compressor section 89, through corresponding ducts or lines 91a, 91b, and 91c. The various compressor stages compress the incoming air to an ever greater degree as it approaches the combustion section of the engine, also heating the air as it is compressed in accordance with well known gas laws. A series of selector valves 93a, 93b, and 93c are selectively controllable to allow bleed air from either the low pressure compressor section 89a, intermediate section 89b, or high pressure section 89c, as desired. It will be seen that additional bleed lines may be provided from other sections of the compressor 89, as desired.

The compressed and heated air then passes through a transfer line 95 to a transfer valve 97, and thence on through a flow control valve 99 and motor selector valve 101 to a pneumatic motor, e.g., motor 69 as illustrated generally in FIG. 1 of the drawings, and/or to other pneumatic drive motors as desired. (only a single pneumatic motor is shown in FIG. 7, for clarity in the drawing Figure.) The pneumatic motor 69 in turn rotates the belt drive roller 44, as discussed further above. The motor selector valve 101 allows airflow to be selected to pass from the valve 101 through either of the two motor supply lines 103a or 103b, thus providing for the motor 69 to run in either direction as desired.

The motor selector valve may route unneeded air therefrom, to a blown surface transfer valve 105, which selectively sends airflow out to the plane surface whereupon it is exhausted through the porous passages of the corresponding moving belt, generally as shown in FIGS. 2 through 5 of the drawings. Excess air may be routed to an overboard exhaust line 107 by means of a regulator valve 109, as desired. It will be seen that the above described pneumatic system is different from that illustrated in FIGS. 2 through 5 and described further above. However, the blown surface control system illustrated in the FIG. 7 schematic may be used alternatively in lieu of the system shown in FIGS. 2 through 5, or the blown surface outlet line extending from the blown surface transfer valve 105 in FIG. 7, may extend to communicate with the porous roller tube 44 (or other moving surface roller, as desired).

The schematic diagram of FIG. 7 may also be used to control the temperature, and thus the density, of the airflow to the blown surfaces, by means of an intercooler 111. The first transfer valve 97 may be partially or completely closed, thereby routing some or all of the airflow from the compressor stage selector valves 93a through 93c to the intercooler 111 by means of an intercooler inlet line 113. Cooling the airflow increases its density further, thereby enhancing the blowing effect provided. Cooled air from the intercooler 111 may be transferred back to the first transfer valve 97 by means of an intercooler outlet line 115, with the cooled airflow being used either to operate the pneumatic motor 69 or routed to one or more of the blown surfaces of the aircraft, as described further above. In the event that heated, less dense air is desired for operation, the intercooler inlet and outlet control valves 117 and 119 may be partially or completely closed, thereby partially or completely restricting all airflow through the intercooler 111. The above described system may also provide suction to the movable surfaces by adjusting the motor selector valve 101 appropriately to prevent pressurized airflow from passing to the blown surface selector valve, and providing suction by means of a conventional venturi, vacuum pump, or other conventional means (not shown).

Figure 9:
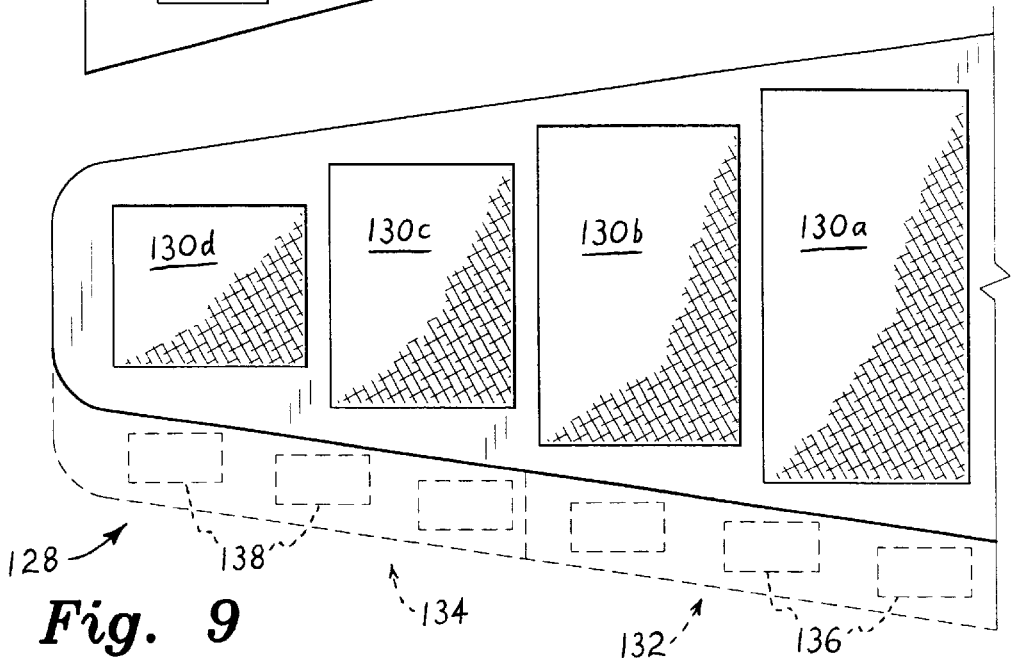
FIG. 9 is a top plan view of a tapered wing or plane incorporating a series of movable surfaces of different chord lengths and showing their application to movable surfaces as well.

FIGS. 8 and 9 illustrate plan views of alternative wing plan forms incorporating the present movable surfaces. In FIG. 8, a swept wing 124 incorporates a series of rearwardly staggered movable surfaces, respectively 126a through 126f from wing root to wing tip. Due to the rectangular configuration of each movable surface area, a staggered series of such surfaces must be provided to make use of the present invention in a swept wing aircraft and maintain the movement of the surfaces essentially in alignment with the slipstream as the aircraft flies. It will be appreciated that the configuration of FIG. 7 may also provide some reduction of spanwise flow, as occurs in swept wing aircraft, particularly at higher angles of attack. The edges of the individual movable surfaces, and their adjacent relatively stationary structure of the wing surface, may provide some limited function as flow fences to limit such spanwise flow. Also, it will be seen that some of the movable surfaces, e.g., the surfaces 126b and 126c, may be relatively widely separated in order to accommodate additional structure, such as engine pylons or nacelles, etc.

FIG. 9 illustrates a wing 128 having a tapered plan form and incorporating a series of progressively shorter movable surfaces, respectively 130a through 130d extending from wing root to wing tip. It will be understood that the present movable surface plane invention is not limited to a straight, rectangular wing plan form, but may be incorporated in virtually any type of wing plan form desired, by positioning the movable surfaces and their rollers accordingly.

The wing 128 of FIG. 9 may also incorporate conventional hinged flight controls, if so desired, as indicated by the flap 132 and aileron 134 shown in broken lines in the drawing Figure. The flap 132 and aileron 134 may in turn incorporate smaller versions, respectively 136 and 138, of the movable surfaces 130a used in the main wing 128 structure, to take advantage of their benefits. Other planes, such as the fixed stabilizer and vertical fin, may also incorporate hingedly movable elevator and rudder control surfaces, which elevator and rudder may also incorporate the moving surfaces of the present invention if so desired. While it is anticipated that flight (and other fluid interacting) surfaces using the present invention will not necessarily be required to have such conventional flight control surfaces, they may be incorporated if so desired, and may include additional movable surfaces to produce even greater efficiencies. For example, it is well known that the use of "blown" air over the upper surface of a wing flap, results in the delay of airflow separation over the flap. The use of the present movable surfaces in combination with such flight controls may provide many of the same benefits.

Figure 10:
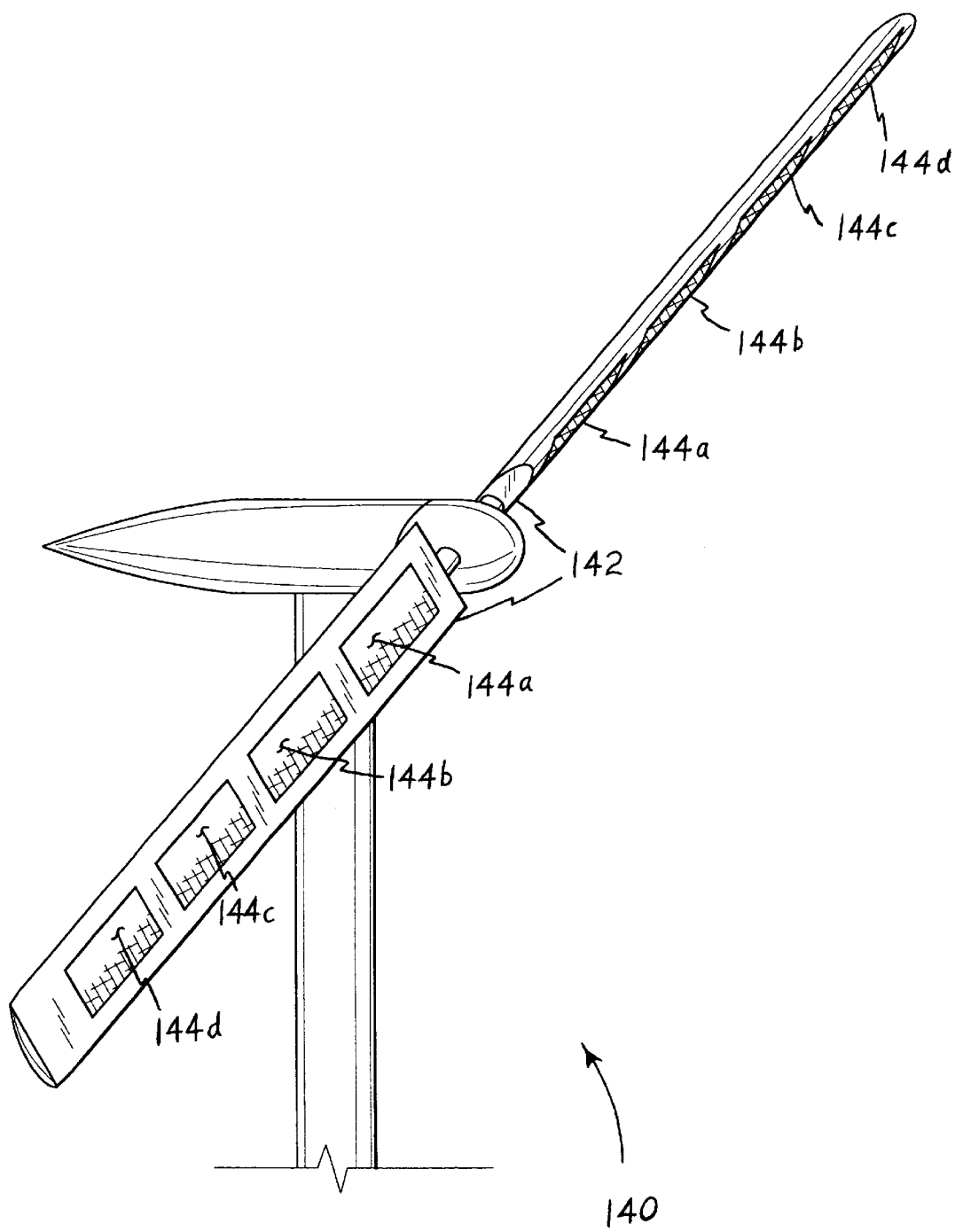
FIG. 10 is a perspective view of a wind generator incorporating the present movable surface plane invention.

As noted further above, the present invention is not limited only to aviation use. FIG. 10 illustrates a further application of the present movable surface plane invention, in which a wind generator incorporates blades 142 each including a series of the present movable surfaces 144a through 144d. (While only the lower face of each blade 142 is shown, it will be understood that both sides of the blades may incorporate such movable surfaces.)

While the incorporation of the present movable surfaces in relatively thin airfoils having relatively long spans and narrow chords poses an engineering challenge, there is nothing in principle to preclude the use of the present movable surfaces in such airfoils. Thus, the present movable surfaces may be extended in application not only to such airfoils in wind generators and the like, but also to such devices as helicopter blades as well. In fact, the use of the present movable surfaces in such devices as helicopter blades may provide unforeseen advantages, by enabling the blades to be made shorter and/or turn at slower rotational speeds, thus facilitating the installation of the present invention in such blades.

Figure 11:
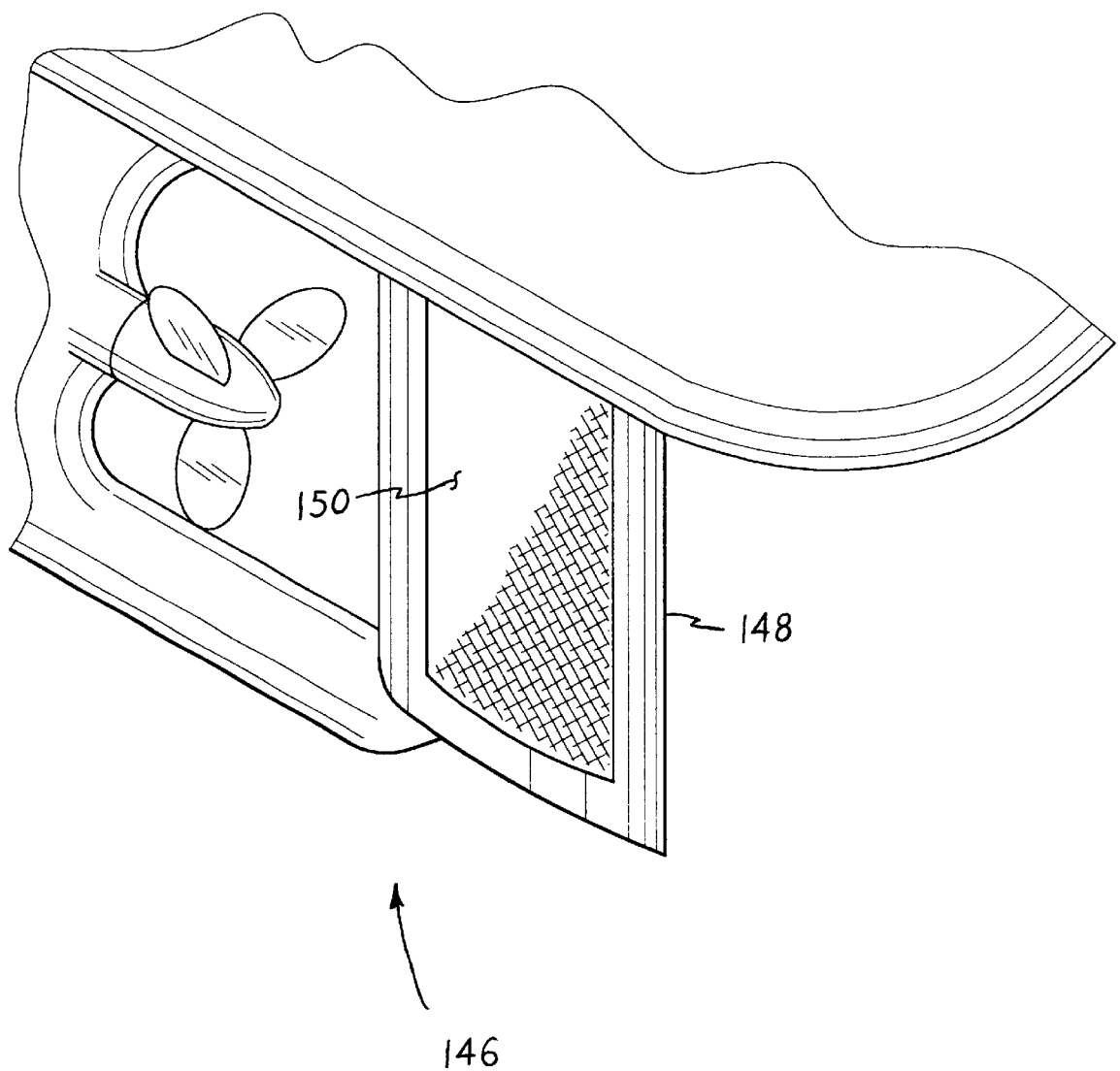
FIG. 11 is a perspective view of a ship's rudder incorporating the present movable surfaces, illustrating the adaptability of the present invention for maritime use.

Finally, while the present disclosure has been primarily directed to the incorporation and use of the present invention in the aviation field, it has been noted at numerous points throughout the present disclosure that the use of the present invention may be extended to other devices which operate by means of a dynamic interaction with any type of fluid. FIG. 11 illustrates such an application for the present invention, in which a ship 146 includes a rudder 148 equipped with the present movable surfaces 150, one of which is shown in the perspective view of FIG. 11. The operation of the movable surfaces 150 of the rudder 148 is basically the same as that discussed above in other embodiments, with no requirement for angular motion of the rudder 148. It is noted that applications of the present movable surfaces may be extended to other maritime uses as well, such as diving and control planes for submarines, etc. The movable surfaces of the devices illustrated in FIGS. 10 and 11 may incorporate the porosity or fluid passages illustrated in FIGS. 2 through 5 and pneumatic system of FIG. 7, and discussed further above. While provision for altering the temperature and density of the air may also be incorporated in any of the devices of FIGS. 1 through 10, it will be recognized that such fluid temperature changing means would not be incorporated in the maritime vessel control surface illustrated in FIG. 11, as no appreciable density change occurs with temperature changes in liquids.

In summary, the present movable surface plane invention provides an improvement in aerodynamic, flight dynamics, and hydrodynamic efficiency for planes (wings, etc.) operating in such environments. The incorporation of two separate, independent movable surfaces on opposite sides of an airfoil or plane, results in a considerable improvement in potential efficiency over prior art devices incorporating only a single endless belt extending about both the upper and lower surface of an airfoil or the like. The present invention enables the user to vary the velocity of each surface independently of the other, thus providing even greater benefits than prior art devices in which the relative velocity of the first surface was equal and opposite to that of the second surface. In addition, the incorporation of means for blowing or drawing air through the movable surface(s), provides further benefits in controlling boundary layer airflow immediately adjacent to the surface. The provision of means for heating or cooling the airflow in order to alter its density, provides even further benefits for aerospace vehicles. The present moving surfaces invention thus provides considerable potential benefit in the aviation, airborne or atmospheric missile, maritime, aerospace vehicles, and other industries and fields where fluid dynamic efficiency is sought.

It is to be understood that the present invention is not limited to the sole embodiment described above, but encompasses any and all embodiments within the scope of the following claims.

We claim:

1. A movable surface plane, comprising:
    a structure having a span, a chord length, a thickness, a leading edge, a trailing edge opposite said leading edge, an outer first surface, and an outer second surface opposite said first surface;
    at least one forward roller and at least one rearward roller disposed within said structure;
    at least one endless, porous belt extending around said at least one forward and said at least one rearward roller and defining at least one said outer surface of said structure; and
    at least one fluid flow distribution system for selectively distributing fluid flow through said at least one porous belt.

2. The movable surface plane according to claim 1, wherein:
    said at least one forward roller comprises forward first and second surface rollers;
    said at least one rearward roller comprises rearward first and second surface rollers; and
    said at least one endless, porous belt comprises at least one endless first surface belt extending around said forward and said rearward first surface rollers and defining said first surface of said structure, and at least one endless second surface belt extending around said forward and said rearward second surface rollers and defining said second surface of said structure.

3. The movable surface plane according to claim 1, further including a plurality of first surface belts and a plurality of second surface belts disposed within said structure.

4. The movable surface plane according to claim 1, wherein each said belt has a roughened texture.

5. The movable surface plane according to claim 1, wherein said structure is an airfoil.

6. The movable surface plane according to claim 5, wherein said airfoil is swept.

7. The movable surface plane according to claim 5, wherein said airfoil is tapered.

8. The movable surface plane according to claim 5, further including:
    at least one movable control surface extending from said airfoil; and
    at least one movable surface disposed in said control surface.

9. The movable surface plane according to claim 1, further including:
    a motor for powering at least one of said at least one forward roller and at least one rearward roller, for actuating said at least one endless, porous belt as desired for varying fluid dynamic pressures developed thereon.

10. The movable surface plane according to claim 1, further including:
    at least one motor for controlling fluid flow through said at least one porous belt; and
    ductwork extending between said motor and said at least one porous belt for controlling fluid flow.

11. The movable surface plane according to claim 1, further including fluid temperature control means for controlling the temperature of fluid flowing through said at least one porous belt.

12. The movable surface plane according to claim 1, wherein said structure is a wind generator blade.

13. The movable surface plane according to claim 1, wherein said structure is a maritime vessel control surface.

14. An aircraft with a movable surface plane, comprising:

an aircraft having a fuselage;

at least one airfoil attached to the fuslage and having a span, a chord length, a thickness, a leading edge, a trailing edge opposite said leading edge, an outer first surface, and an outer second surface opposite said first surface;

at least one forward roller and at least one rearward roller disposed within said airfoil;

at least one endless, porous belt extending around said at least one forward and said at least one rearward roller and defining at least one said outer surface of said airfoil; and at least one fluid flow distribution system for selectively distributing fluid flow through said porous belt.

15. The aircraft according to claim 14, wherein:

said at least one forward roller comprises forward first and second surface rollers;

said at least one rearward roller comprises rearward first and second surface rollers; and said at least one endless, porous belt comprises at least one endless first surface belt extending around said forward and said rearward first surface rollers and defining said first surface of said structure, and at least one endless second surface belt extending around said forward and said rearward second surface rollers and defining said second surface of said structure.

16. The aircraft according to claim 14, wherein said airfoil includes a plurality of first surface belts and a plurality of second surface belts disposed therein.

17. The aircraft according to claim 14, wherein each said belt has a roughened texture.

18. The aircraft according to claim 14, wherein said airfoil is swept.

19. The aircraft according to claim 14, wherein said airfoil is tapered.

20. The aircraft according to claim 14, further including:

at least one movable control surface extending from said airfoil; and at least one movable surface disposed in said control surface.

21. The aircraft according to claim 20, wherein said movable control surface is selected from the group consisting of ailerons, flaps, elevators, and rudders.

22. The aircraft according to claim 14, wherein said airfoil is selected from the group consisting of wings, horizontal stabilizer and control surfaces, and vertical stabilizer and control surfaces.

23. The aircraft according to claim 14, further including:

means for powering at least one said first surface roller and at least one second surface roller, for actuating said first surface and said second surface.

24. The aircraft according to claim 14, further including:

means for remotely and selectively controlling said first surface and said second surface as desired for varying aerodynamic pressures developed thereon.

25. The aircraft according to claim 14, further including:

a motor for powering at least one of said at least one forward roller and at least one rearward roller, for actuating said at least one endless, porous belt as desired for varying fluid dynamic pressures developed thereon.

26. The aircraft according to claim 14, further including:

at least one motor for controlling fluid flow through said at least one porous belt; and ductwork extending between said motor and said at least one porous belt for controlling fluid flow.

27. The aircraft according to claim 14, further including fluid temperature control means for controlling the temperature of fluid flowing through said at least one porous belt.

* * * * *